United States Patent
Kwak et al.

(10) Patent No.: US 11,256,938 B2
(45) Date of Patent: Feb. 22, 2022

(54) METHOD AND APPARATUS WITH LIVENESS TESTING

(71) Applicant: Samsung Electronics Co., Ltd., Suwon-si (KR)

(72) Inventors: Youngjun Kwak, Seoul (KR); Byung In Yoo, Seoul (KR); Yong-Il Lee, Daejeon (KR); Yunhao Zhang, Xian (CN); Huxing Sun, Xian (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/939,757

(22) Filed: Jul. 27, 2020

(65) Prior Publication Data
US 2021/0166045 A1 Jun. 3, 2021

(30) Foreign Application Priority Data
Dec. 3, 2019 (KR) .................. 10-2019-0159186

(51) Int. Cl.
*G06K 9/00* (2006.01)
*G06T 7/521* (2017.01)
*G06N 3/08* (2006.01)

(52) U.S. Cl.
CPC ..... *G06K 9/00906* (2013.01); *G06K 9/00255* (2013.01); *G06K 9/00275* (2013.01);
(Continued)

(58) Field of Classification Search
CPC .......... G06K 9/00906; G06K 9/00288; G06K 9/00275; G06K 9/00255; G06K 9/2018; G06K 9/00228; G06K 9/00302; G06K 9/6202; G06K 9/00201; G06K 9/6267; G06K 2209/05; G06K 9/00268; G06K 9/00899; G06K 9/34; G06K 9/38; G06K 9/42; G06K 9/6268; G06K 9/6273; G06K 9/628; G06T 7/521; G06T 2207/10028;
(Continued)

(56) References Cited

U.S. PATENT DOCUMENTS

2011/0025827 A1* 2/2011 Shpunt .................. G06T 7/593
  348/47
2012/0257797 A1* 10/2012 Leyvand ................ A63F 13/40
  382/118

(Continued)

OTHER PUBLICATIONS

Erdogmus, Nesli et al., "Spoofing in 2D Face Recognition with 3D Masks and Anti-spoofing with Kinect." *2013 IEEE Sixth International Conference on Biometrics: Theory, Applications and Systems (BTAS)*, 2013 (pp. 1-6).

(Continued)

*Primary Examiner* — Nimesh Patel
(74) *Attorney, Agent, or Firm* — NSIP Law

(57) ABSTRACT

A method with liveness testing may include: acquiring an infrared (IR) image including an object, and a depth image including the object; generating a first preprocessed IR image by performing first edge enhancement preprocessing on the IR image; generating a preprocessed depth image by performing second edge enhancement preprocessing on the depth image; and determining whether the object is a genuine object based on the first preprocessed IR image and the preprocessed depth image.

21 Claims, 16 Drawing Sheets

(52) U.S. Cl.
CPC .......... *G06K 9/00288* (2013.01); *G06N 3/08* (2013.01); *G06T 7/521* (2017.01)

(58) Field of Classification Search
CPC . G06T 2207/10048; G06T 2207/30201; G06T 2207/10024; G06T 7/50; G06T 2207/20084; G06T 7/20; G06T 7/55; G06T 7/70; G06T 7/73; G06N 3/08; G06N 20/00; G06N 3/0454; G06N 3/006; G06N 3/0445; G06N 3/084; G06N 3/088; G06F 21/32; G06F 1/3231; G06F 21/50; G06F 3/017; G06F 1/3206; G06F 2221/2111; G06F 2221/2113; G06F 3/013; G06F 3/0304; G01B 11/25; G01B 11/22; G01B 11/24; G01B 11/026; G01B 11/0608; G01B 11/14; G01B 11/26; G01B 11/303; G01B 2210/60
See application file for complete search history.

(56) References Cited

U.S. PATENT DOCUMENTS

| | | | |
|---|---|---|---|
| 2017/0041585 A1* | 2/2017 | Liu | G06T 5/005 |
| 2017/0180348 A1 | 6/2017 | Piccolotto et al. | |
| 2017/0345146 A1* | 11/2017 | Fan | G06K 9/00228 |
| 2018/0060648 A1* | 3/2018 | Yoo | G06K 9/00899 |
| 2018/0144447 A1* | 5/2018 | Tate | G06T 5/50 |
| 2018/0276455 A1 | 9/2018 | An et al. | |
| 2019/0130168 A1 | 5/2019 | Khitrov et al. | |
| 2019/0251237 A1* | 8/2019 | Park | G06T 7/74 |
| 2019/0306413 A1* | 10/2019 | Liu | H04N 5/332 |
| 2020/0250403 A1* | 8/2020 | Xiao | G06K 9/00268 |

OTHER PUBLICATIONS

Simón, Marc Oliu et al., "Improved RGB-DT based Face Recognition." *IET Biometrics*, 5, No. 4, 2016 (pp. 1-20).

Milioto, Andres et al., "Real-time Semantic Segmentation of Crop and Weed for Precision Agriculture Robots Leveraging Background Knowledge in CNNs." *In 2018 IEEE international conference on robotics and automation (ICRA)*, 2018 (pp. 1-7).

Hu, Wei et al., "Exploring Hypergraph Representation on Face Anti-spoofing Beyond 2D Attacks." arXiv:1811.11594v2, 2018 (pp. 1-10).

Zhang, Shifeng et al., "A Dataset and Benchmark for Large-scale Multi-modal Face Anti-spoofing." *In Proceedings of the IEEE Conference on Computer Vision and Pattern Recognition*, 2019 (pp. 919-928).

Parkin, Aleksandr et al., "Recognizing Multi-Modal Face Spoofing with Face Recognition Networks." *2019 IEEE/CVF Conference on Computer Vision and Pattern Recognition Workshops (CVPRW)*, 2019 (pp. 1-7).

Shen, Tao et al., "FaceBagNet: Bag-of-local-features Model for Multi-modal Face Anti-spoofing." *Proceedings of the IEEE/CVF Conference on Computer Vision and Pattern Recognition (CVPR) Workshops*, 2019 (pp. 1-6).

* cited by examiner

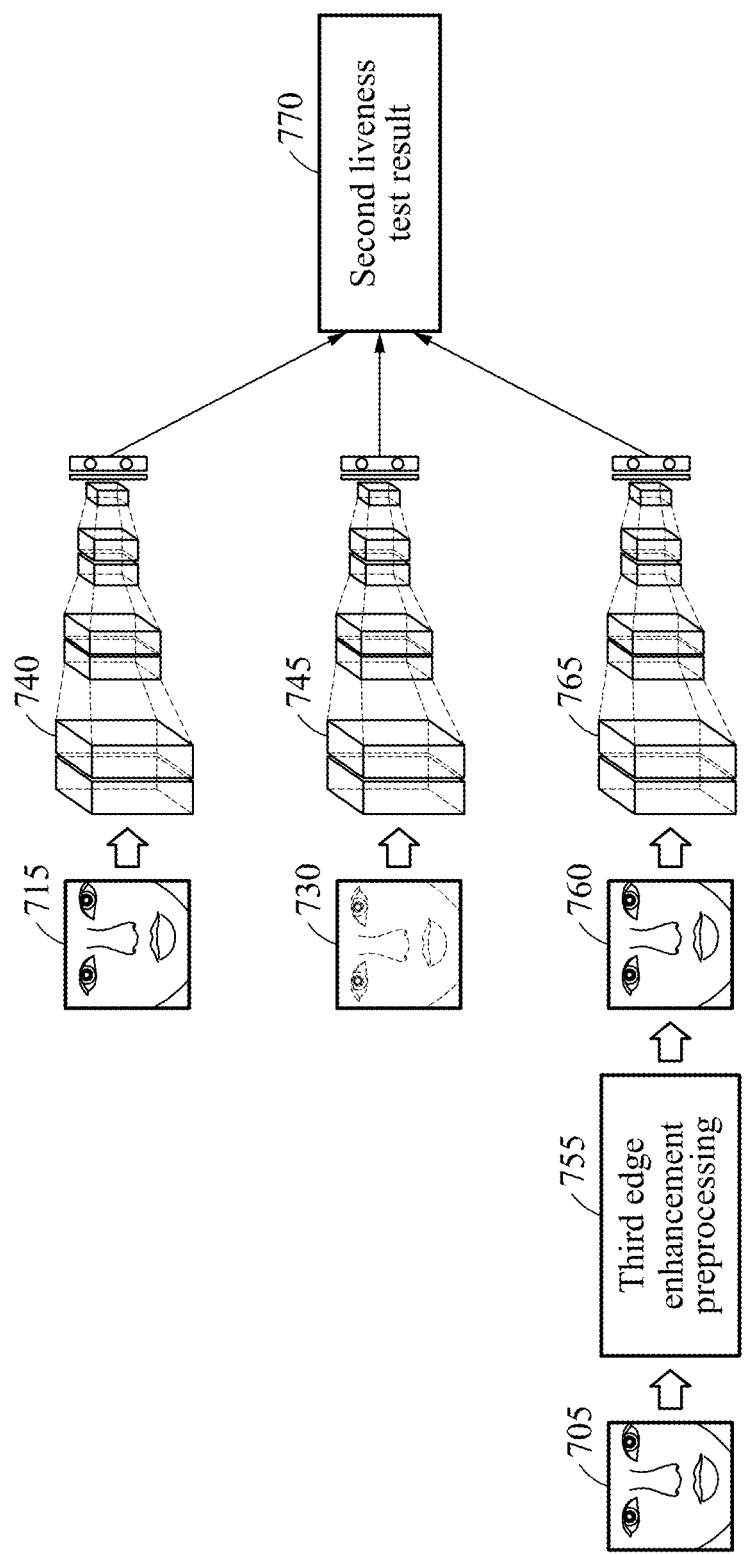

METHOD AND APPARATUS WITH LIVENESS TESTING

CROSS-REFERENCE TO RELATED APPLICATIONS

This application claims the benefit under 35 USC § 119(a) of Korean Patent Application No. 10-2019-0159186 filed on Dec. 3, 2019 in the Korean Intellectual Property Office, the entire disclosure of which is incorporated herein by reference for all purposes.

BACKGROUND

1. Field

The following description relates to liveness test technology.

2. Description of Related Art

In a user authentication system, a computing device determines whether to allow an access to the computing device based on authentication information provided by a user. The authentication information includes a password input by the user or biometric information of the user. The biometric information includes information related to a fingerprint, an iris, or a face.

Recently, there is a growing interest in face anti-spoofing technology as a security method for user authentication systems. Face anti-spoofing verifies whether a face of a user input into the computing device is a fake face or a genuine face. For this, features such as Local Binary Patterns (LBP), Histogram of Oriented Gradients (HOG), and Difference of Gaussians (DoG) are extracted from the input image, and whether the input face is a fake face is determined based on the extracted features. Face spoofing is in the form of attacks using a photo, a video, or a mask. In face authentication, it is important to identify such attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method with liveness testing includes: acquiring an infrared (IR) image including an object, and a depth image including the object; generating a first preprocessed IR image by performing first edge enhancement preprocessing on the IR image; generating a preprocessed depth image by performing second edge enhancement preprocessing on the depth image; and determining whether the object is a genuine object based on the first preprocessed IR image and the preprocessed depth image.

The determining of whether the object is a genuine object may include: determining a first liveness test result based on the first preprocessed IR image and the preprocessed depth image; generating a second preprocessed IR image by performing third edge enhancement preprocessing on the IR image, in response to the first liveness test result satisfying a condition; and determining a second liveness test result based on the second preprocessed IR image.

The third edge enhancement preprocessing may be a different type of edge enhancement preprocessing than the first edge enhancement preprocessing.

The determining of the second liveness test result may include determining the second liveness test result based on a first liveness score corresponding to the first preprocessed IR image, a second liveness score corresponding to the preprocessed depth image, and a third liveness score corresponding to the second preprocessed IR image.

The first liveness score may be determined using a neural network-based first liveness test model that receives the first preprocessed IR image as an input. The second liveness score may be determined using a neural network-based second liveness test model that receives the preprocessed depth image as an input. The third liveness score may be determined using a neural network-based third liveness test model that receives the second preprocessed IR image as an input.

The first preprocessed IR image may be an IR image in which an edge component is enhanced in comparison to the IR image.

The generating of the first preprocessed IR image may include: generating a first intermediate image based on pixel values of a current pixel and neighboring pixels in the IR image; generating a second intermediate image by performing normalization on the IR image; and generating the first preprocessed IR image based on the IR image, the first intermediate image, and the second intermediate image.

A pixel of the first preprocessed IR image may have a pixel value of a pixel at a corresponding position in the IR image, a pixel value of a pixel at a corresponding position in the first intermediate image, and a pixel value of a pixel at a corresponding position in the second intermediate image.

The generating of the preprocessed depth image may include: transforming the object, in the depth image, into a frontal object; and generating the preprocessed depth image by performing the second edge enhancement preprocessing on the depth image in which the object is transformed into the frontal object.

The transforming of the object, in the depth image, into the frontal object may include: determining feature points in the depth image; determining a transformation matrix based on positions of the respective feature points in the depth image and positions of reference points corresponding to the respective feature points; and transforming the object, in the depth image, into the frontal object by applying the determined transformation matrix to the object in the depth image.

The determining of whether the object is a genuine object may include: determining a first liveness score using a neural network-based first liveness test model that receives the first preprocessed IR image as an input; determining a second liveness score using a neural network-based second liveness test model that receives the preprocessed depth image as an input; and determining whether the object is a genuine object based on the first liveness score and the second liveness score.

The method may further include allowing or blocking access to a device performing the method, based on a result of the determining of whether the object is a genuine object.

In another general aspect, a non-transitory computer-readable storage medium stores instructions that, when executed by a processor, cause the processor to perform the method described above.

In another general aspect, an apparatus with liveness testing includes: at least one image sensor configured to acquire an infrared (IR) image including an object, and a depth image including the object; and a processor. The processor is configured to: generate a first preprocessed IR image by performing first edge enhancement preprocessing on the IR image; generate a preprocessed depth image by performing second edge enhancement preprocessing on the depth image; and determine whether the object is a genuine object based on the first preprocessed IR image and the preprocessed depth image.

The processor may be further configured to: determine a first liveness test result based on the first preprocessed IR image and the preprocessed depth image; generate a second preprocessed IR image by performing third edge enhancement preprocessing on the IR image, in response to the first liveness test result satisfying a condition; and determine a second liveness test result based on the second preprocessed IR image.

The processor may be further configured to determine the second liveness test result based on a first liveness score corresponding to the first preprocessed IR image, a second liveness score corresponding to the preprocessed depth image, and a third liveness score corresponding to the second preprocessed IR image.

The processor may be further configured to: generate a first intermediate image based on pixel values of a current pixel and neighboring pixels in the IR image; generate a second intermediate image by performing normalization on the IR image; and generate the first preprocessed IR image based on the IR image, the first intermediate image, and the second intermediate image.

The processor may be further configured to: transform the object, in the depth image, into a frontal object; and generate the preprocessed depth image by performing the second edge enhancement preprocessing on the depth image in which the object is transformed into the frontal object.

The processor may be further configured to: determine feature points in the depth image; determine a transformation matrix based on positions of the respective feature points in the depth image and positions of reference points corresponding to the respective feature points; and transform the object, in the depth image, into the frontal object by applying the determined transformation matrix to the object in the depth image.

The apparatus of claim 18, wherein the processor is further configured to: determine a first liveness score using a neural network-based first liveness test model that receives the first preprocessed IR image as an input; determine a second liveness score using a neural network-based second liveness test model that receives the preprocessed depth image as an input, and determine whether the object is a genuine object based on the first liveness score and the second liveness score.

The processor may be further configured to allow or block access to the apparatus, based on a result of the determining of whether the object is a genuine object.

In another general aspect, a user authentication method includes: performing a first liveness test on an object based on a first preprocessed IR image and a preprocessed depth image, wherein the first preprocessed IR image is obtained from first edge enhancement preprocessing of an acquired IR image including the object, and the preprocessed depth image is obtained from second edge enhancement preprocessing of an acquired depth image including the object; and preliminarily determining whether to block access to a device to which access is sought by a user, based on a first liveness test score determined by the first liveness test.

The performing of the first liveness test may include: determining a first liveness score using a neural network-based first liveness test model that receives the first preprocessed IR image as an input; determining a second liveness score using a neural network-based second liveness test model that receives the preprocessed depth image as an input; and determining the first liveness test score by combining the first and second liveness scores.

The user authentication method may further include, in response to a result of the preliminarily determining whether to block access to the device being preliminarily determining not to block access to the device: performing a second liveness test based on a second preprocessed IR image obtained from third edge enhancement preprocessing of the acquired IR image; and finally determining whether to allow access to the device, based on a second liveness test score determined by a second liveness test score determined by the second liveness test.

The performing of the first liveness test may include: determining a first liveness score using a neural network-based first liveness test model that receives the first preprocessed IR image as an input; determining a second liveness score using a neural network-based second liveness test model that receives the preprocessed depth image as an input; and determining the first liveness test score by combining the first and second liveness scores. The performing of the second liveness test may include: determining a third liveness score using a neural network-based third liveness test model that receives the second preprocessed IR image as an input; and determining the second liveness test score by combining the first, second, and third liveness scores.

The preliminarily determining of whether to block access to the device may include preliminarily determining whether to block access to the device by comparing the first liveness test score to a first threshold score. The finally determining of whether to allow access to the device may include finally determining whether to allow access to the device by comparing the second liveness test score to a second threshold score.

Other features and aspects will be apparent from the following detailed description, the drawings, and the claims.

BRIEF DESCRIPTION OF THE DRAWINGS

FIGS. 7A and 7B illustrate examples of determining a liveness test result.

Throughout the drawings and the detailed the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
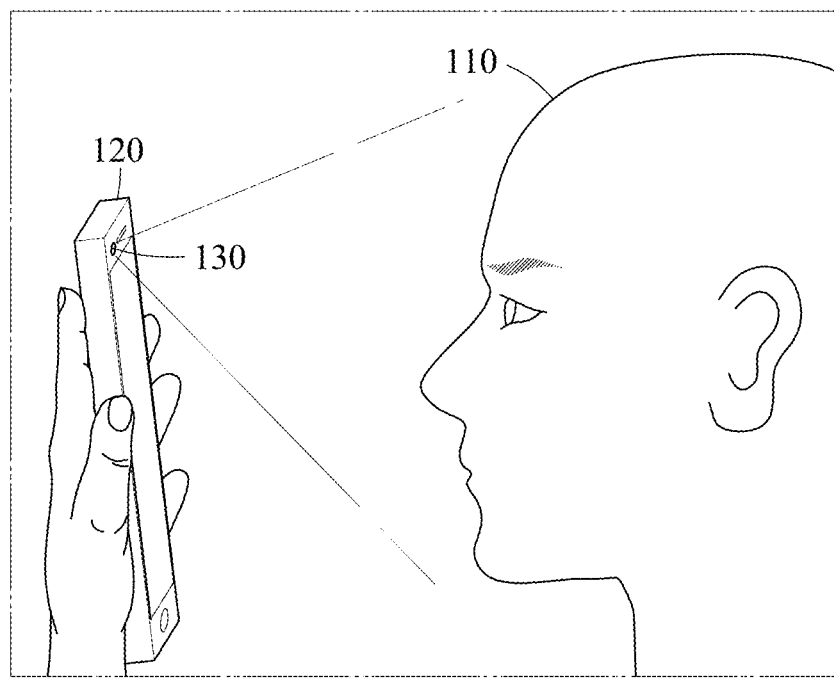
FIGS. 1 and 2 illustrate examples of a liveness test.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains, and as understood based on the disclosure herein. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2:
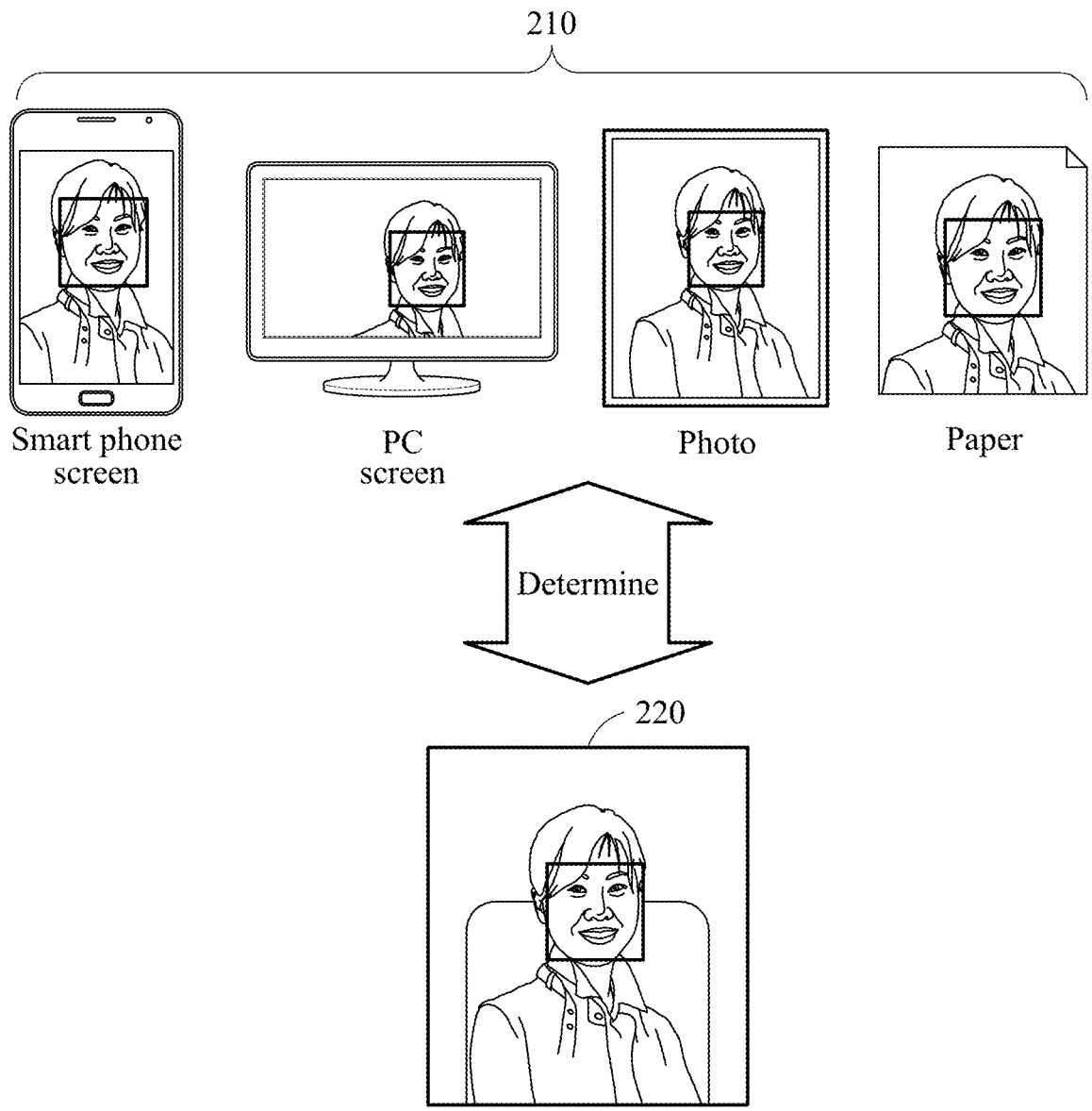

FIGS. 1 and 2 illustrate examples of a liveness test.

Referring to FIG. 1, an electronic device 120 performs an authentication process with respect to a user 110 attempting to access the electronic device 120 through a face verification. For example, when the user 110 attempts a face verification on the electronic device 120 to unlock the electronic device 120, the electronic device 120 acquires a face image of the user 110 using an image sensor or an image acquiring device such as a camera 130, and determines whether to unlock the electronic device 120 to analyze the acquired face image. A process of analyzing the face image includes a process of detecting a face region in the face image and extracting features from the face region using a feature extractor. The extracted features may be compared to enrolled features of a valid user, and whether the face verification is successful may be determined based on a result of the comparing. In response to the determination that the face verification is successful, the user 110 may succeed in unlocking the electronic device 120. Conversely, in response to the determination that the face verification is failed, the electronic device 120 may continuously operate while being locked. In another example, when the user 110 performs a face verification on the electronic device 120 to perform a payment service through the electronic device 120, the electronic device 120 acquires a face image of the user 110 and may approve a payment request when the user 110 is recognized as a valid user as a result of analyzing the face image. Otherwise, if the user 110 is not recognized as a valid user as a result of analyzing the face image, the electronic device 120 may reject the payment request.

A valid user may enroll his/her face in the electronic device 120 in advance through a face enrollment process, and the electronic device 120 may store information to be used to identify the valid user in a storage device or cloud storage. For example, a face image of the valid user or facial features extracted from the face image are stored as enrolled information of the valid user. The electronic device 120 may be, for example, a smart phone, a wearable device, a tablet computer, a netbook, a laptop, a desktop, a personal digital assistant (PDA), a set-top box, a home appliance, a biometric door lock, a security device, or a vehicle starting device. However, the electronic device 120 is not limited to the examples listed herein.

In the biometric authentication process such as the face verification described above, a liveness test may be performed. The liveness test may be performed before or after the biometric authentication result is determined. In another example, the biometric authentication process and the liveness test process may be performed together. The liveness test is employed to test whether an object being a test subject is an animate object, and to determine whether an authentication means is genuine. For example, the liveness test tests whether a face shown in an image captured by the camera 130 is a genuine face of a person or a fake face. The liveness test is used to discriminate between inanimate objects (for example, a photo, paper, a video, and a model as a fake means) and animate objects (for example, a real face of a person).

FIG. 2 illustrates examples of fake faces 210 and a genuine face 220. The electronic device 120 may identify the genuine face 220 in a test subject image acquired by capturing a real user face, through a liveness test. Further, the electronic device 120 may identify a fake face 210 in a test subject image acquired by capturing a user face displayed on a PC screen or a smart phone screen, a user face in a photo, a user face printed on paper, or a model of the user face, through a liveness test.

An invalid user may attempt to cause a false acceptance of a user authentication system using spoofing techniques. For example, in a face verification, the invalid user may present a color photo, a video, or a model of a face of a valid user to the camera 130, to cause a false acceptance by the electronic device 120. The liveness test may prevent a false acceptance by filtering authentication attempts (for example, spoofing attacks) using a substitute such as a photo, a video, a mask, or a model. For example, in response to the determination that the authentication subject is an inanimate object as a result of the liveness test, the electronic device 120 does not move to a user authentication operation of comparing the input object with an enrolled object to determine matching therebetween, or determines that the user authentication is finally failed irrespective of a user authentication result.

Referring back to FIG. 1, for the liveness test, the electronic device 120 may acquire an infrared (IR) image and a depth image through the camera 130. For example, the IR image is acquired by an IR camera, and the depth image is acquired by a depth camera. In another example, the IR image and the depth image are acquired by the IR camera, without using a separate depth camera. In this example, depth information represented by the depth image is determined based on a pattern of IR reflected light received by the IR camera.

The electronic device 120 may perform the liveness test using the IR image and the depth image acquired as described above. Unlike the IR image and the depth image, a color image is greatly affected by an environment (for example, lightings and shadows) in which the color image is captured. A method of using a color image has a disadvantage of being vulnerable to spoofing attacks by a high-definition medium such as a high-definition display device or printout. When an IR image and a depth image are used, this disadvantage may be overcome. Through an IR image, reflection characteristic of an object and a texture characteristic by the reflection of IR rays may be considered, and thus a liveness test robust against the effects of lightings or shadows may be performed. Through a depth image, a cubic effect characteristic of an object may be considered, and thus a liveness test robust against spoofing attacks using an image shown on a plane such as a display device or a printout may be performed. When both the IR image and the depth image are used, a false acceptance by spoofing techniques may be effectively prevented, and the accuracy of the liveness test may be improved.

In the examples set forth below, an IR image and a depth image are preprocessed to perform a liveness test. For example, edge enhancement preprocessing effective in a liveness test is performed, and the accuracy of the liveness test is further improved by using the edge enhancement preprocessed IR image and the edge enhancement preprocessed depth image.

Figure 3:
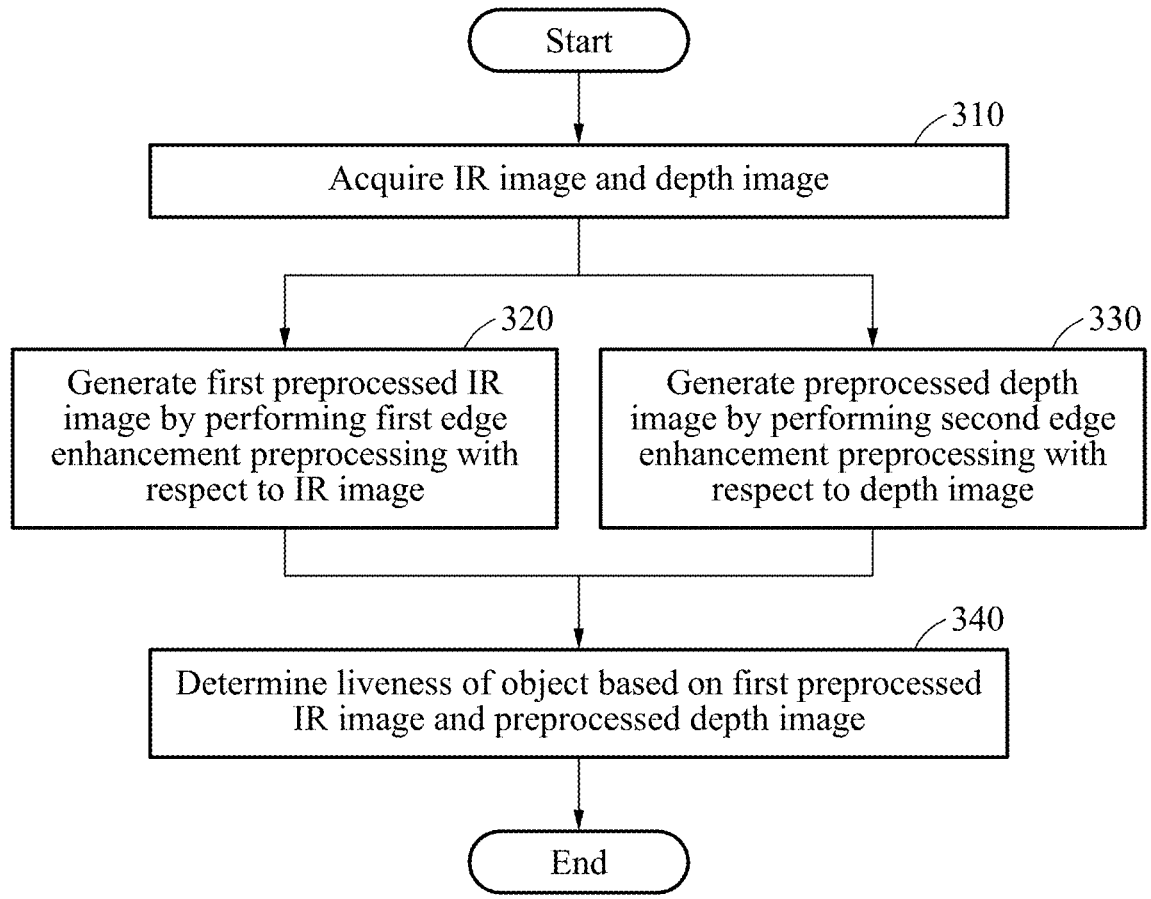
FIG. 3 illustrates an example of operations of a liveness test method.

FIG. 3 illustrates an example of operations of a liveness test method. The liveness test method may be performed by a liveness test apparatus described herein.

Referring to FIG. 3, in operation 310, the liveness test apparatus acquires an IR image including an object and a depth image including the object. The liveness test apparatus acquires the IR image and the depth image through an image sensor. The IR image and the depth image may be captured at the same time by the image sensor, or captured at a time interval. The IR image and the depth image may be acquired by image sensors configured to respectively sense an IR value and a depth value, or extracted based on an IR value sensed through a single image sensor.

The IR image may be acquired by sensing, using the image sensor, an IR ray reflected by an object after being radiated from an IR light source. The depth image may be acquired through a time-of-flight (ToF)-based sensor or a structured light-based sensor, and each pixel of the depth image may have a value indicating a depth or a distance to a corresponding point. However, the method of acquiring an IR image and a depth image is not limited to the aforementioned methods.

In operation 320, the liveness test apparatus generates a first preprocessed IR image by performing first edge enhancement preprocessing with respect to the IR image. The first preprocessed IR image is an IR image in which an edge component is enhanced when compared to the original IR image.

To generate the preprocessed IR image, the liveness test apparatus may first detect a face region and feature points, such as facial landmarks, in the IR image. For example, the liveness test apparatus may detect the face region in the IR image using a Viola-Jones detector, a neural network trained to detect a face region, or a Haar-based cascade AdaBoost classifier. However, the detection of the face region is not limited to the foregoing examples. The liveness test apparatus may detect a face region in an input image using various face region detection techniques. For example, the liveness test apparatus detects facial landmarks in the IR image and detects a bounding region including the detected landmarks as the face region. The liveness test apparatus may detect both endpoints of a left eye, both endpoints of a right eye, a nose tip point, and points corresponding to both corners of a mouth, as the feature points in the face region. The first edge enhancement preprocessing performed in operation 320 may be construed as being performed with respect to the face region detected in the IR image.

The liveness test apparatus performs the first edge enhancement preprocessing to process the IR image to a form more appropriate for a liveness test or a face verification. For example, the liveness test apparatus acquires the first preprocessed IR image by applying an edge enhancement filter appropriate for the liveness test to the IR image. The liveness test apparatus generates the first preprocessed IR image in which an edge component is enhanced (or augmented) by performing the first edge enhancement preprocessing with respect to the IR image. For example, as a result of the first edge enhancement preprocessing, the first preprocessed IR image may include an edge that is sharpened in comparison to the original IR image.

In relation to the first edge enhancement preprocessing process, the liveness test apparatus generates a first intermediate image based on pixel values of a current pixel and neighboring pixels in the IR image, generates a second intermediate image by performing normalization on the IR image, and generates the first preprocessed IR image based on the original IR image, the first intermediate image, and the second intermediate image.

For example, the liveness test apparatus generates the first intermediate image by performing edge enhancement based on a pixel value of the current pixel and pixel values of the neighboring pixels of the current pixel in the IR image. In detail, the liveness test apparatus may generate a first channel IR image configured with a pixel value of a neighboring pixel positioned immediately above each pixel included in the IR image, a second channel IR image configured with a pixel value of a neighboring pixel positioned immediately below each pixel included in the IR image, a third channel IR image configured with a pixel value of a neighboring pixel positioned immediately on the left side of each pixel included in the IR image, and a fourth channel IR image configured with a pixel value of a neighboring pixel positioned immediately on the right side of each pixel included in the IR image. The liveness test apparatus may generate a single-channel IR image in which the four-channel IR images are combined, by combining pixel values of a pixel at corresponding positions in the first, second, third, and fourth channel IR images generated as described above. Here, the combination of the pixel values may be a sum, a mean, or a weighted sum of the pixel values. However, the combination scheme is not limited to the foregoing example. For example, the liveness test apparatus may generate the first intermediate image by combining pixel values of a pixel at corresponding positions in the generated single-channel IR image and the original IR image. Similar to the above example, the combination of the pixel values may be a mean, a weighted sum, or a simple sum of the pixel values. However, the combination scheme is not limited to the foregoing description. In an example, the liveness test apparatus may adjust the range of pixel values of the first intermediate image by performing normalization, such as a zero-mean technique, on the first intermediate image.

In another example, the liveness test apparatus generates the first intermediate image by applying other edge enhancement filters, for example, of Canny, Histogram of Oriented Gradients (HOG), Local Binary Pattern (LBP), or Sobel, to the IR image. However, the disclosure is not limited to the example edge enhancement filters described above. Other edge enhancement filters or techniques may apply to the liveness test apparatus without limitation.

Further, the liveness test apparatus may generate the second intermediate image by performing normalization on the IR image. For example, the liveness test apparatus may generate the second intermediate image to have the adjusted range of pixel values by determining a maximum value and a minimum value among the pixel values of the IR image and performing normalization, such as a zero-mean technique, based on the maximum value and the minimum value.

The liveness test apparatus generates the first preprocessed IR image by combining the IR image, the first intermediate image, and the second intermediate image. For example, the liveness test apparatus may generate the first preprocessed IR image by configuring pixel values of pixels corresponding to each other (that is, at the same position) in the IR image, the first intermediate image, and the second intermediate image, as three channels. For example, a pixel of the first preprocessed IR image generated as described above has a pixel value of a pixel at a corresponding position in the IR image, a pixel value of a pixel at a corresponding position in the first intermediate image, and a pixel value of a pixel at a corresponding position in the second intermediate image.

In operation 330, the liveness test apparatus generates a preprocessed depth image by performing second edge enhancement preprocessing with respect to the depth image.

The liveness test apparatus first performs preprocessing that changes a pose of the object (a face) shown in the depth image. For example, the liveness test apparatus may perform preprocessing that transforms the object shown in the depth image into a frontal object. In an example of the preprocessing process, the liveness test apparatus determines feature points of an object in the depth image by matching the face region and the feature points detected in the IR image to the depth image. The liveness test apparatus may determine positions in the depth image corresponding to the positions of the feature points detected in the IR image to be the positions of the feature points of the depth image. The liveness test apparatus performs preprocessing including either one or both of a translation and a rotation of the object shown in the depth image based on the feature points determined in the depth image. For example, the liveness test apparatus may determine a transformation matrix based on the positions of the respective feature points of the depth image and positions of reference points corresponding to the respective feature points, and may generate a depth image in which the object is transformed into a frontal object by applying the determined transformation matrix to the object shown in the depth image.

The liveness test apparatus performs second edge enhancement preprocessing on the depth image in which the object is transformed into a frontal object, for processing the depth image to a form more appropriate for the liveness test. The second edge enhancement preprocessing may be the same as the first edge enhancement preprocessing described in operation 320, except that the second edge enhancement preprocessing is performed on the depth image. For example, the second edge enhancement preprocessing may include a process of generating the first intermediate image and the second intermediate image from the depth image and generating the preprocessed depth image based on the original depth image, the first intermediate image, and the second intermediate image, in a manner similar to that described above.

The first edge enhancement preprocessing and the second edge enhancement preprocessing correspond to edge enhancement preprocessing for effectively handling two-dimensional (2D) spoofing attacks that use a display device or a photo.

In operation 340, the liveness test apparatus determines a liveness of the object based on the first preprocessed IR image and the preprocessed depth image. Determining the liveness of the object includes determining whether the object is an animate genuine object or an inanimate fake object. The liveness test apparatus may sequentially perform a first liveness test considering 2D liveness characteristics and a second liveness test considering three-dimensional (3D) liveness characteristics.

First, for example, in the first liveness test, the liveness test apparatus determines a first liveness test result based on the first preprocessed IR image and the preprocessed depth image.

In the first liveness test, the liveness test apparatus may determine a first liveness score using a neural network-based first liveness test model which receives the first preprocessed IR image as an input, and determines a second liveness score using a neural network-based second liveness test model which receives the preprocessed depth image as an input. The liveness test apparatus determines the liveness of the object based on the first liveness score and the second liveness score. The liveness test apparatus combines the first liveness score and the second liveness score and determines the liveness based on a result of the combining. Here, a combination of the first liveness score and the second liveness score may be a mean, a weighted sum, or a simple sum of the first liveness score and the second liveness score. However, the combination scheme is not limited to the foregoing examples. The liveness test apparatus may determine the object that is a test subject to be a genuine object if a result value obtained by combining of the first liveness score and the second liveness score is greater than a threshold value, and may determine the object to be a fake object if the result value is less than or equal to the threshold value.

If the first liveness test result does not satisfy a condition, for example, if the object is determined to be a fake object according to the first liveness test result, the liveness test apparatus may finally determine the object to be a fake object, without performing the second liveness test. Conversely, if the first liveness test result satisfies the condition, for example, if the object is determined to be a genuine object according to the first liveness test result, the liveness test apparatus may perform the second liveness test.

In the second liveness test process, the liveness test apparatus generates a second preprocessed IR image by performing third edge enhancement preprocessing on the IR image. The third edge enhancement preprocessing is a different type of edge enhancement preprocessing different from the first edge enhancement preprocessing previously applied to the IR image. The third edge enhancement preprocessing is, for example, edge enhancement preprocessing for effectively handling 3D spoofing attacks that use silicon, a mask, or a model. For example, the third edge enhancement preprocessing may be an edge enhancement preprocessing scheme using a Laplacian filter. In this example, the third edge enhancement preprocessing process corresponds to the first edge enhancement preprocessing process modified to generate a first intermediate image by applying the Laplacian filter to the IR image.

The liveness test apparatus determines a second liveness test result based on the generated second preprocessed IR image. For example, the liveness test apparatus may determine the second liveness test result based on the first liveness score corresponding to the first preprocessed IR image, the second liveness score corresponding to the preprocessed depth image, and a third liveness score corresponding to the second preprocessed IR image. The first liveness score and the second liveness score may be determined using the first liveness test model and the second liveness test model according to the first liveness test process. The second liveness score may be determined using the second liveness test model which receives the preprocessed depth image as an input. The third liveness score may be determined using a neural network-based third liveness test model which receives the second preprocessed IR image as an input.

The liveness test apparatus determines a final liveness of the object based on the first, second, and third liveness scores. For example, the liveness test apparatus combines the first, second, and third liveness scores and determines the liveness based on a result of the combining. Here, a combination of the first, second, and third liveness scores may be a mean, a weighted sum, or a simple sum of the first, second, and third liveness scores. However, the combination scheme is not limited to the aforementioned examples. The liveness test apparatus may finally determine the object that is the test subject to be a genuine object if a result value obtained by combining the first, second, and third liveness scores is greater than a threshold value, and may determine the object to be a fake object if the result value is less than or equal to the threshold value.

The liveness test model described in the above examples may be, for example, a neural network configured to output a value calculated by internal parameters based on input data. The liveness test model provides the liveness score indicating a feature value, a probability value, or a value that a face object being a test subject corresponds to a genuine face or a fake face, based on the input data. The liveness score is a value that is a standard for determining the liveness of the object. For example, the liveness test model may be based on a deep convolutional neural network (DCNN) model. The DCNN model includes a convolution layer, a pooling layer, and a fully connected layer, and provides information for determining the liveness from image information input into the liveness test model through a computing process performed by each layer. Here, the image information is pixel values (for example, color values and/or brightness values) of pixels included in an image. The DCNN model is merely provided as an example. The liveness test model may be based on a neural network model of a structure other than that of the DCNN model.

Parameters constituting the liveness test model may be parameters determined through a training process based on training data. In the training process, there are numerous training data and desired values corresponding to the training data. In the training process, the liveness test model receives training data and outputs result values corresponding to the training data through a computing process based on the parameters. The liveness test model may be trained by calculating a loss caused by differences between the output values and the desired values and adjusting the parameters constituting the liveness test model to reduce the loss. By iteratively performing this training process with respect to each item of the numerous training data, the parameters of the liveness test model may be adjusted gradually as desired.

The liveness test apparatus may perform a control operation in response to the liveness test result with respect to the object. If the test subject is finally determined to be a genuine object, the liveness test apparatus may generate a control signal for requesting the execution of a user authentication procedure. Conversely, if the object is finally determined to be a fake object other than a genuine object, the liveness test apparatus may generate a control signal for blocking an access of a user to the electronic device 120, for example, rather than requesting execution of the user authentication process.

According to the liveness test method as described above, by sequentially performing a liveness test for effectively handling 2D spoofing attacks and a liveness test for effectively handling 3D spoofing attacks, various types of spoofing attacks may be effectively prevented, and thus the accuracy of the liveness test may improve. Further, by applying preprocessing processes effective in the liveness test to the IR image and the depth image, the accuracy of the liveness test may improve further.

Figure 4A:
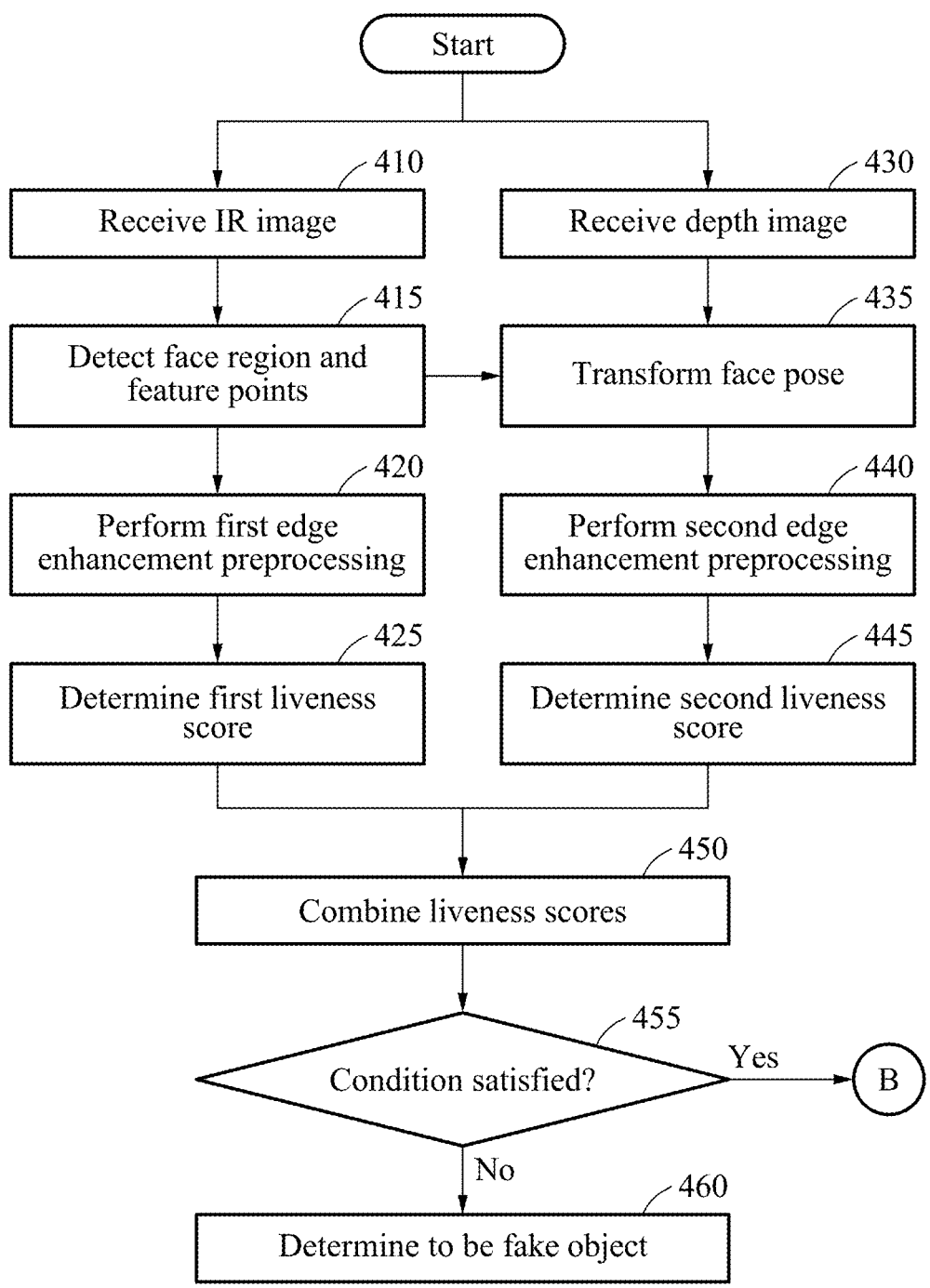
FIGS. 4A and 4B illustrate an example of a liveness test method.
Figure 4B:
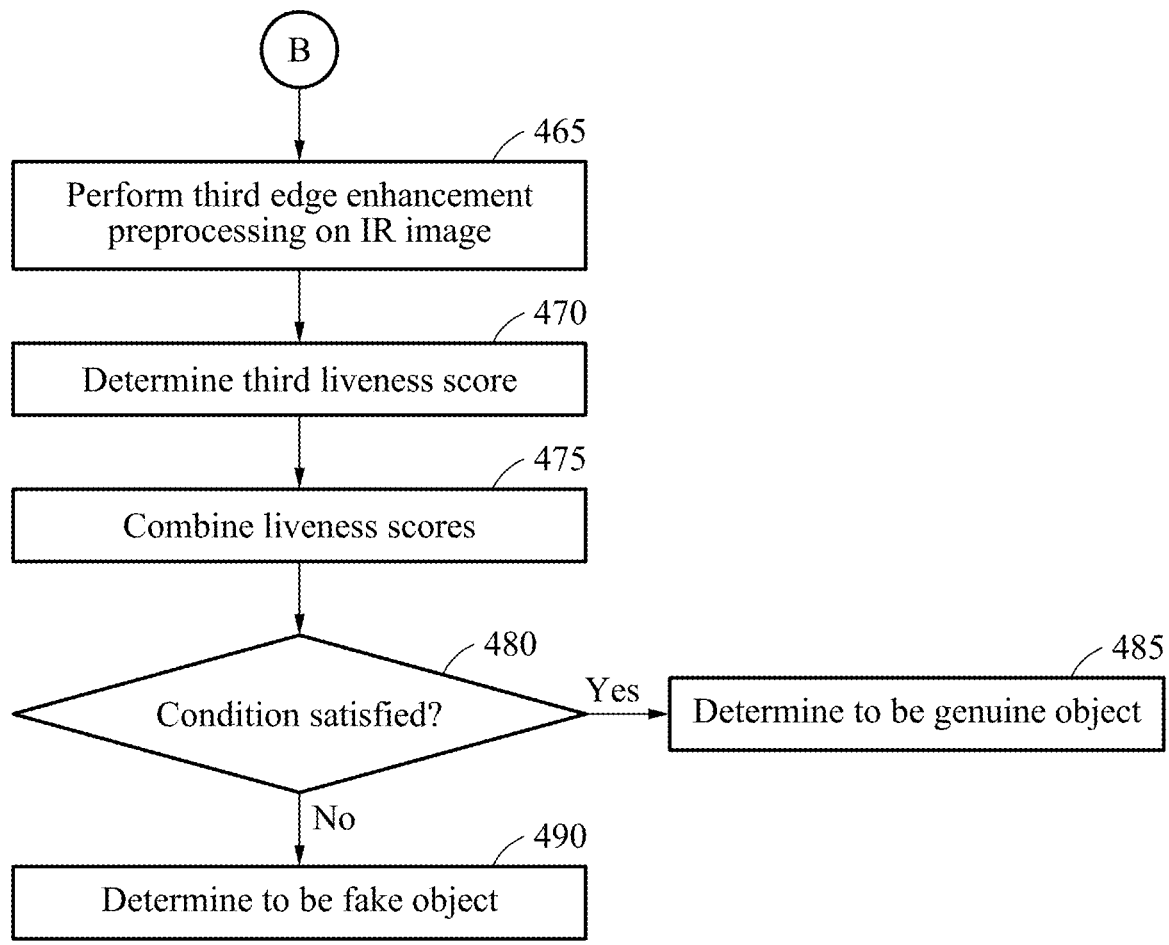

FIGS. 4A and 4B illustrate an example of a liveness test method. The description provided with reference to FIGS. 1 to 3 also applies to the example of FIGS. 4A and 4B and is incorporated in the description of FIGS. 4A and 4B by reference. Thus, the duplicate description will be omitted here for conciseness.

Referring to FIG. 4A, in operation 410, the liveness test apparatus receives an IR image. In operation 415, the liveness test apparatus detects a face region and feature points including facial landmarks in the IR image. The liveness test apparatus may detect the face region in the IR image using a Viola-Jones detector, a Haar-based cascade AdaBoost classifier, or a neural network trained to detect a face region. The liveness test apparatus may detect, for example, both endpoints of a left eye, both endpoints of a right eye, a nose tip point, and points corresponding to both corners of a mouth, as the feature points in the face region.

In operation 420, the liveness test apparatus performs first edge enhancement preprocessing with respect to the IR image. The first edge enhancement preprocessing may be performed with respect to a patch region corresponding to the face region of the IR image. For example, the liveness test apparatus generates a first preprocessed IR image that is an IR image in which an edge component is enhanced by performing the first edge enhancement preprocessing with respect to the IR image. The liveness test apparatus may generate the first preprocessed IR image with a new characteristic of the IR image using an edge emphasis filter such as Canny, HOG, LBP or Sobel, or using a scheme of using the intermediate images described with reference to FIG. 3.

In operation 425, the liveness test apparatus determines a first liveness score using a first liveness test model which receives the first preprocessed IR image as an input. The first liveness test model outputs the first liveness score indicating a possibility index that an object corresponds to a genuine object based on information (for example, pixel values) of the input first preprocessed IR image.

In operation 430, the liveness test apparatus receives a depth image corresponding to the IR image. The IR image and the depth image are acquired by capturing the same object from the same viewpoint.

In operation 435, the liveness test apparatus transforms a face pose based on positions of the face region and the feature points in the depth image. The liveness test apparatus may determine the positions of the face region and the feature points in the depth image by matching the positions of the face region and the feature points in the IR image detected in operation 415 to the depth image. The liveness test apparatus may determine a transformation matrix based on a relationship between the positions of the feature points determined in the depth image and positions of reference points corresponding to the frontal face, and may transform a pose of the object shown in the depth image into a pose of a frontal face by applying the determined transformation matrix to the depth image.

In operation 440, the liveness test apparatus performs second edge enhancement preprocessing on the depth image. The second edge enhancement preprocessing may be performed with respect to a patch region corresponding to a face region in the depth image. The liveness test apparatus generates a preprocessed depth image, which is a depth image in which an edge component is enhanced by performing the second edge enhancement preprocessing with respect to the depth image. The second edge enhancement preprocessing may be the same as the first edge enhancement preprocessing, except that the second edge enhancement preprocessing is performed on the depth image. For example, the second edge enhancement preprocessing may include a process of generating a first intermediate image and a second intermediate image from the depth image, and generating the preprocessed depth image based on the original depth image, the first intermediate image, and the second intermediate image, as described above.

In operation 445, the liveness test apparatus determines a second liveness score using a second liveness test model which receives the preprocessed depth image as an input. The second liveness test model outputs the second liveness score indicating a possibility index that the object corresponds to a genuine object based on information (for example, pixel values) of the input preprocessed depth image.

In operation 450, the liveness test apparatus determines a combination value by combining the first liveness score and the second liveness score. For example, the liveness test apparatus may determine a sum, a mean, or a weighted sum of the first liveness score and the second liveness score to be the combination value. Here, the scheme of determining the combination value is merely provided as a non-limiting example.

In operation 455, the liveness test apparatus determines whether the determined combination value satisfies a defined condition. For example, the liveness test apparatus may determine whether the combination value is greater than a threshold value. If the combination value does not satisfy the condition, for example, if the combination value is less than or equal to the threshold value, the liveness test apparatus may finally determine the object to be a fake object, in operation 460. The process from operations 410 to 460 may constitute a first liveness test process.

If the combination value does not satisfy the condition, for example, if the combination value is greater than the threshold value, the liveness test apparatus may perform a second liveness test process shown in FIG. 4B.

Referring to FIG. 4B, in operation 465, the liveness test apparatus performs third edge enhancement preprocessing on the IR image. The third edge enhancement preprocessing is edge enhancement preprocessing that may easily detect a 3D liveness. For example, the liveness test apparatus may use an edge enhancement preprocessing scheme using a Laplacian filter. The liveness test apparatus generates a second preprocessed IR image by performing the third edge enhancement preprocessing on the IR image.

In operation 470, the liveness test apparatus determines a third liveness score using a third liveness test model which receives the second preprocessed IR image as an input. The third liveness test model outputs the third liveness score indicating a possibility index that an object corresponds to a genuine object based on information (for example pixel values) of the input second preprocessed IR image.

In operation 475, the liveness test apparatus determines a combination value by combining the first, second, and third liveness scores. For example, the liveness test apparatus may determine a sum, a mean, or a weighted sum of the first, second, and third liveness scores to be the combination value. However, the scheme of determining the combination value is not limited to this example.

In operation 480, the liveness test apparatus determines whether the determined combination value satisfies a defined condition. For example, the liveness test apparatus may determine whether the combination value is greater than a threshold value. If the combination value is greater than the threshold value, the liveness test apparatus may finally determine the object to be a genuine object, in operation 485. Conversely, if the combination value is less than or equal to the threshold value, the liveness test apparatus may finally determine the object to be a fake object, in operation 490.

Meanwhile, in the flowcharts of FIGS. 3 to 4B, if an example is implemented differently, a function or an operation stated in a predetermined block may be performed differently from the flowcharts. For example, two successive blocks may be performed substantially at the same time in practice, or in a reversed order of the blocks depending on a related function or operation. In another example, blocks shown in parallel may be performed substantially sequentially in practice.

Figure 5:
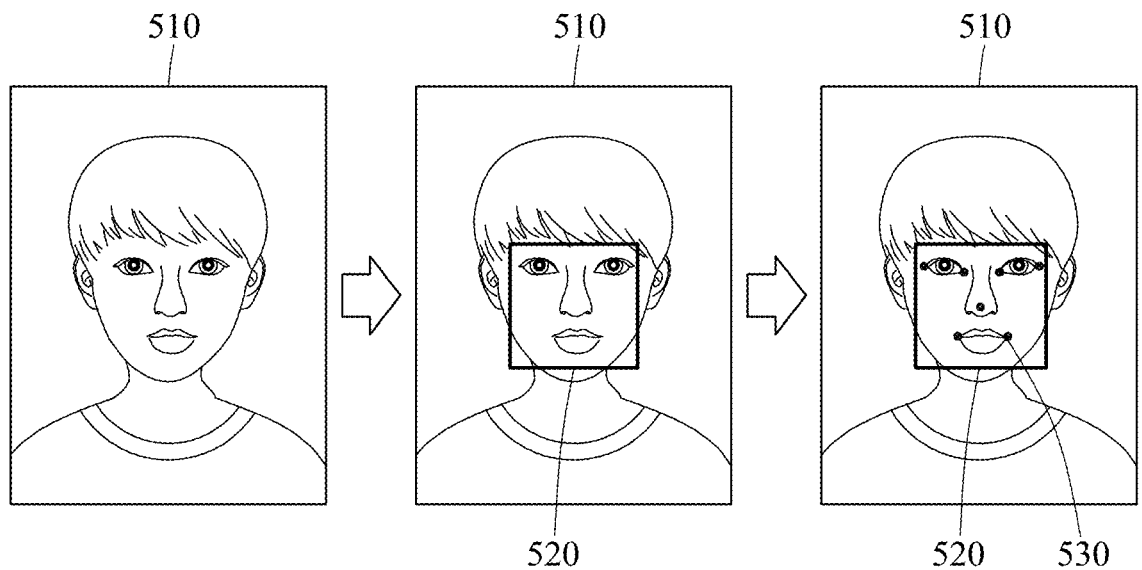
FIG. 5 illustrates an example of detecting a face region and feature points from an infrared (IR) image.

FIG. 5 illustrates an example of detecting a face region and feature points from an IR image.

Referring to FIG. 5, the liveness test apparatus may receive an IR image 510 and detects a face region 520 in the IR image 510. For example, the liveness test apparatus may detect the face region 520 using, for example, a neural network, a Viola-Jones detector, or a Haar-based cascade AdaBoost classifier. The liveness test apparatus may detect feature points 530 corresponding to endpoints of both eyes, a nose tip point, and both corner points of a mouth in the face region 520. For example, the liveness test apparatus may detect the feature points 530 using a technique such as Speeded Up Robust Features (SURF), Active Appearance Model (AAM), Active Shape Model (ASM), Supervised Descent Method (SDM), or deep learning.

Figure 6:
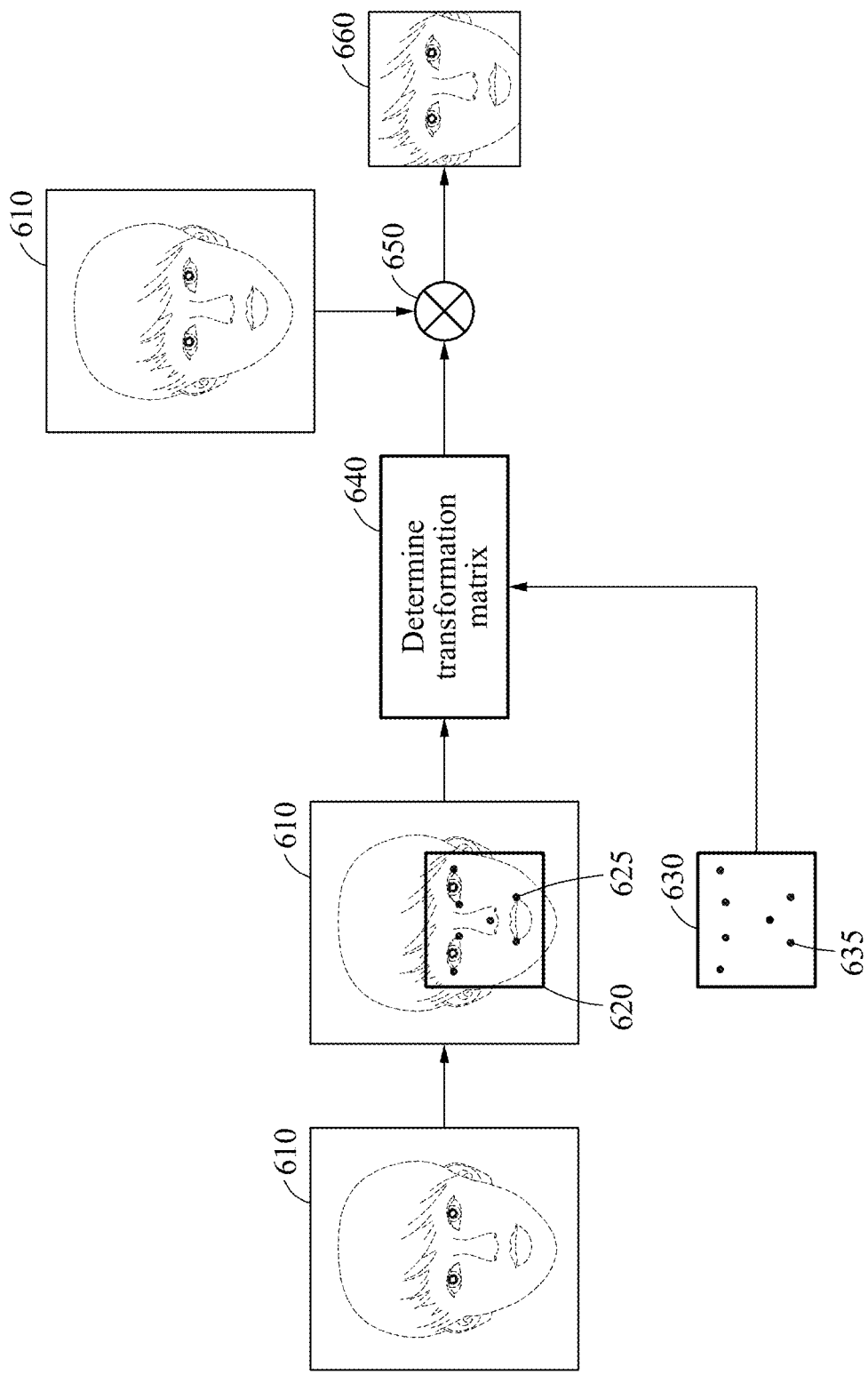
FIG. 6 illustrates an example of transforming a pose of an object in a depth image.

FIG. 6 illustrates an example of transforming a pose of an object in a depth image.

Referring to FIG. 6, the liveness test apparatus may receive a depth image 610. The liveness test apparatus may determine a face region 620 and feature points 625 of an object in the depth image 610 by mapping, to the depth image 610, a face region and feature points detected in an IR image corresponding to the depth image 610.

The liveness test apparatus determines a correspondence between the face region 620 and the feature points 625 of the depth image 610 and a predefined face region 630 and reference points 635. In this example, positions of the reference points 635 correspond to positions of endpoints of both eyes, a nose tip point, and both corner points of a mouth corresponding to a frontal face. In operation 640, the liveness test apparatus determines a transformation matrix based on a positional relationship between the feature points 625 of the depth image 610 and the respectively corresponding reference points 635. The transformation matrix is a translation and rotation matrix configured to perform either one or both of a translation and a rotation of the object.

The liveness test apparatus generates a preprocessed depth image 960 in which a pose of the object is transformed through an application 650 of the determined transformation matrix to the depth image 610 or the face region 620 of the depth image 610. As a result of applying the transformation matrix, the object in the preprocessed depth image 660 may be in a predefined pose (for example, a frontal face pose).

Figure 7A:
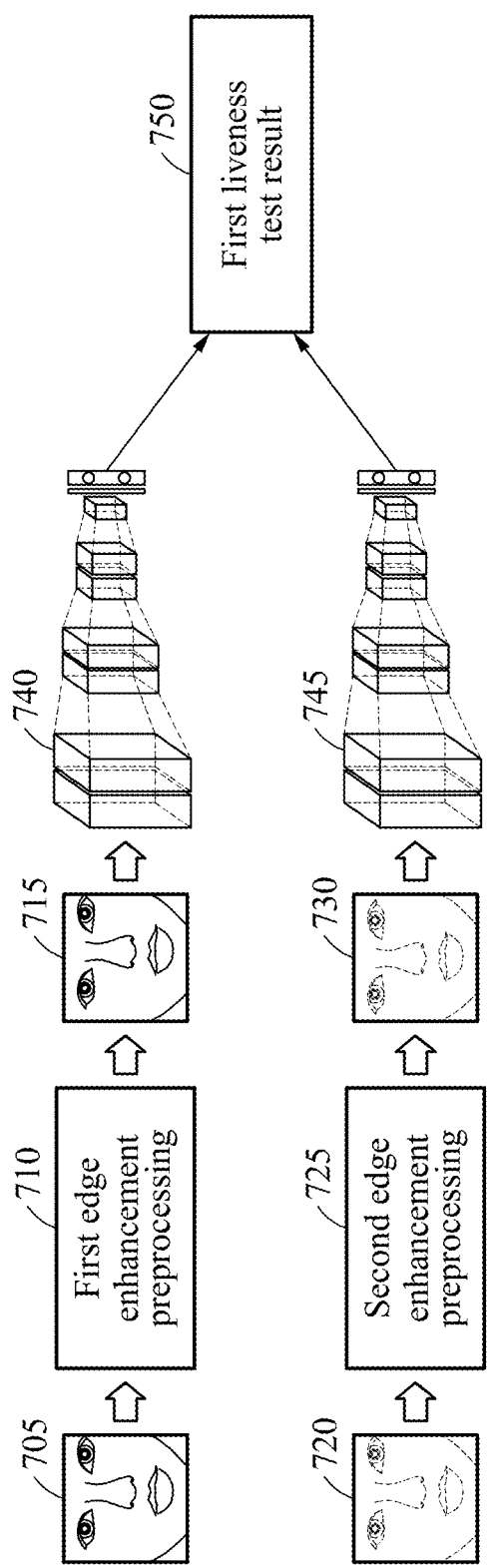

FIGS. 7A and 7B illustrate examples of determining a liveness test result.

Referring to FIG. 7A, the liveness test apparatus generates a first preprocessed IR image 715 by performing first edge enhancement preprocessing 710 on an IR image 705 corresponding to a face region. The first edge enhancement preprocessing 710 may include image processing for emphasizing an edge of the IR image 705. Further, the liveness test apparatus generates a preprocessed depth image 730 by performing second edge enhancement preprocessing 725 on a depth image 720 corresponding to the face region. The second edge enhancement preprocessing 725 may be the same as or similar to the first edge enhancement preprocessing 710. For example, an edge enhancement filter that is the same as or similar to that used for the first edge enhancement preprocessing 710 may be used for the second edge enhancement preprocessing 725.

The first preprocessed IR image 715 is input into a first liveness test model 740, and the first liveness test model 740 outputs a first liveness score corresponding to the first preprocessed IR image 715. The preprocessed depth image 730 is input into a second liveness test model 745, and the second liveness test model 745 outputs a second liveness score corresponding to the preprocessed depth image 730. The liveness test apparatus determines a liveness test result 750 based on the first liveness score and the second liveness score. For example, the liveness test apparatus compares a combination value of the first liveness score and the second liveness score to a threshold value and determines a first liveness test result based on a result of the comparing. For example, if the combination value is greater than the threshold value, the object is determined to be a genuine object. For example, if the combination value is less than or equal to the threshold value, the object is determined to be a fake object.

The first and second liveness test models 740 and 745 may be separately implemented. However, in some examples, the first and second liveness test models 740 and 745 may be implemented as a single integrated liveness test model. In this example, the single liveness test model receives the first preprocessed IR image 715 and the preprocessed depth image 730 as an input and outputs a liveness score corresponding to the input. The liveness test model compares the liveness score to a threshold value and determines a first liveness test result based on a result of the comparing.

Referring to FIG. 7B, in response to the object being determined to be a genuine object according to the first liveness test result, the liveness test apparatus generates a second preprocessed IR image 760 by performing third edge enhancement preprocessing 755 with respect to the IR image 705. The third edge enhancement preprocessing 755 is edge enhancement preprocessing different from the first edge enhancement preprocessing 710. For example, the first edge enhancement preprocessing 710 is edge enhancement preprocessing for effectively handling 2D spoofing attacks, and the third edge enhancement preprocessing 755 is edge enhancement preprocessing for effectively handling 3D spoofing attacks. The second preprocessed IR image 760 is input into a third liveness test model 765, and the third liveness test model 765 outputs a third liveness score corresponding to the second preprocessed IR image 760.

The liveness test apparatus determines a second liveness test result 770 based on the first and second liveness scores determined in the example of FIG. 7A and the third liveness score determined by the third liveness test model 765. The liveness test apparatus may combine the first, second, and third liveness scores and determines a liveness based on a result of the combining. Here, a combination of the first, second, and third liveness scores may be a mean, a weighted sum, or a simple sum of the first, second, and third liveness scores. The liveness test apparatus may finally determine the object that is the test subject to be a genuine object if a result value obtained by combining the first, second, and third liveness scores is greater than a threshold value, and may determine the object to be a fake object if the result value is less than or equal to the threshold value.

FIGS. 8A to 8E illustrate examples of edge enhancement preprocessing processes with respect to an IR image.

Figure 8A:
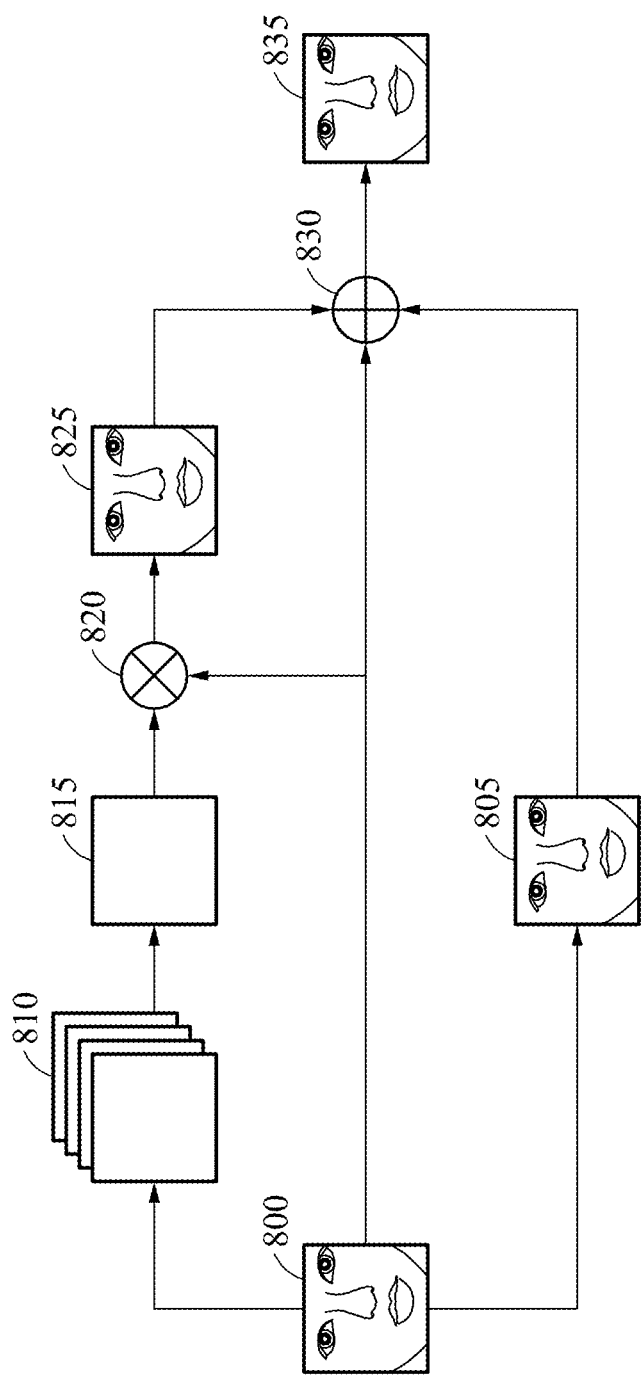
FIGS. 8A to 8E illustrate examples of edge enhancement preprocessing processes with respect to an IR image.
Figure 8B:
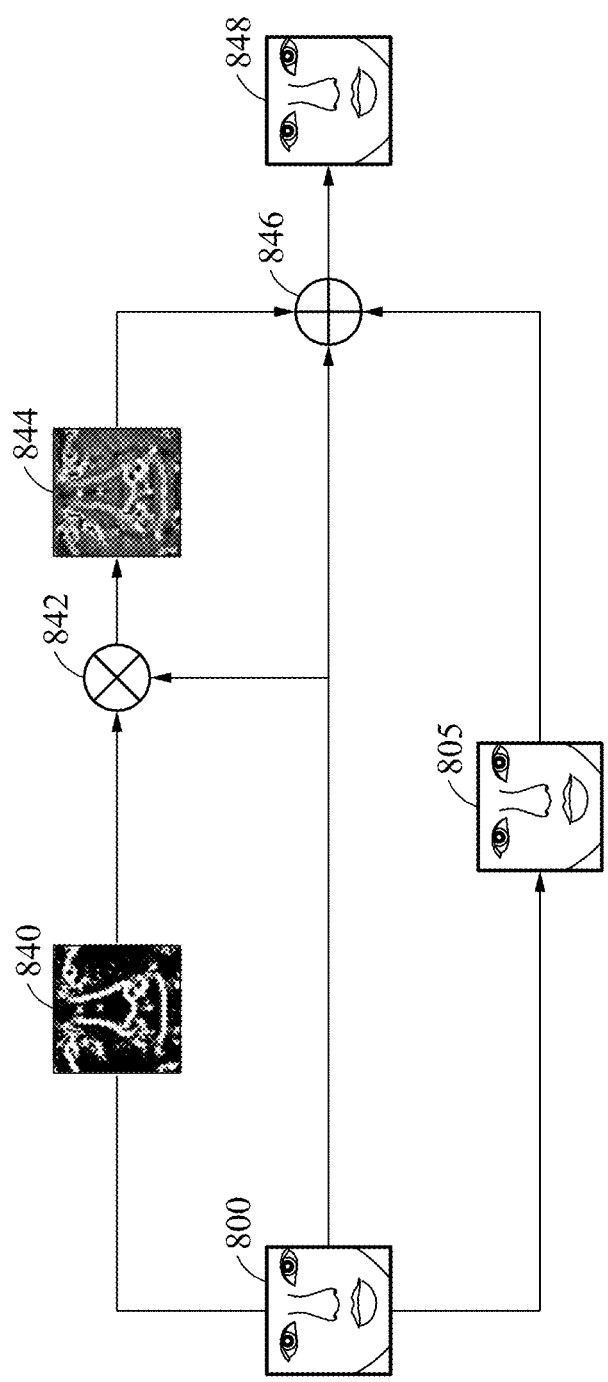

Referring to FIG. 8A, the liveness test apparatus acquires an IR image in the form more appropriate for a liveness test through an edge enhancement preprocessing process. First, the liveness test apparatus receives an IR image 800. The IR image 800 corresponds to a face region.

The liveness test apparatus generates four-channel IR images including a first channel IR image configured with a pixel value of a neighboring pixel positioned immediately above each pixel included in the IR image 800, a second channel IR image configured with a pixel value of a neighboring pixel positioned immediately below each pixel included in the IR image 800, a third channel IR image configured with a pixel value of a neighboring pixel positioned immediately on the left side of each pixel included in the IR image 800, and a fourth channel IR image configured with a pixel value of a neighboring pixel positioned immediately on the right side of each pixel included in the IR image 800. The first, second, third, and fourth channel IR images are collectively illustrated as images 810 in FIG. 8A.

The liveness test apparatus generates a single-channel IR image 815 in which the four-channel IR images are combined, by combining pixel values of a pixel at corresponding positions in the first, second, third, and fourth channel IR images 810 generated as described above. Here, the combination of the pixel values may be a mean, a weighted sum, or a simple sum of the pixel values.

The liveness test apparatus generates a first intermediate image 825 through a combination 820 of pixel values of a pixel at the same position in the single-channel IR image 815 and the IR image 800. The combination of the pixel values may be a mean, a weighted sum, or a simple sum of the pixel values. In an example, the liveness test apparatus may perform normalization on the first intermediate image 825. For example, the liveness test apparatus transforms the pixel values of the first intermediate image 825 such that the pixel values of the first intermediate image 825 are within a predefined range.

The liveness test apparatus generates a second intermediate image 805 by performing normalization on the IR image 800. The liveness test apparatus may generate the second intermediate image 805 by determining a maximum value and a minimum value among the pixel values of the IR image 800 and transforming the pixel values of the IR image 800 such that the pixel values of the IR image 800 are within a predefined range.

The liveness test apparatus generates a desired first preprocessed IR image 835 through a combination 830 of the first intermediate image 825, the second intermediate image 805, and the IR image 800. For example, the liveness test apparatus generates the first preprocessed IR image 835 by configuring pixel values of pixels at the same position in the first intermediate image 825, the second intermediate image 805, and the IR image 800, as three channels. Thus, each pixel of the first preprocessed IR image 835 may have a pixel value of a pixel at a corresponding position in the IR image 800, a pixel value of a pixel at a corresponding position in the first intermediate image 825, and a pixel value of a pixel at a corresponding position in the second intermediate image 805.

In an example, the first intermediate image 825 of FIG. 8A may be generated in a different manner. For example, referring to FIG. 8B, a result image 840 is generated by applying an edge enhancement filter of LBP to the IR image 800, and a first intermediate image 844 is generated through a combination 842 of the result image 840 and the IR image 800. Then, a first preprocessed IR image 848 is generated through a combination 846 of the first intermediate image 844, the second intermediate image 805, and the IR image 800.

Figure 8C:
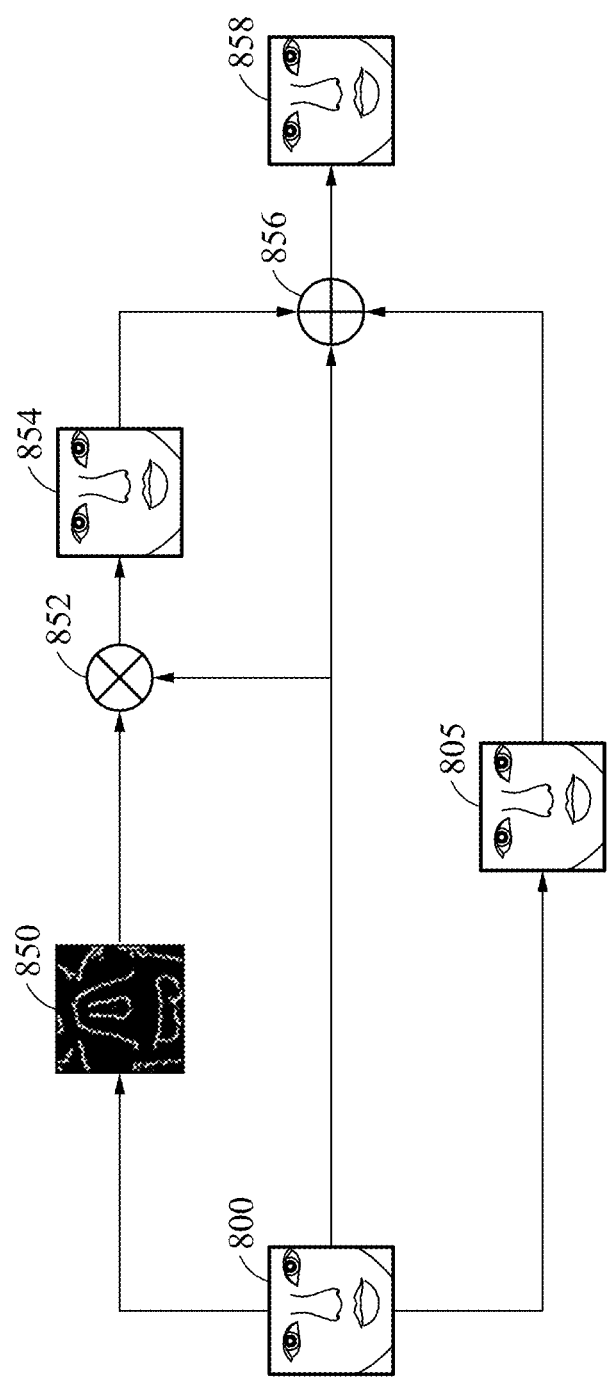

In another example, referring to FIG. 8C, a result image 850 is generated by applying an edge enhancement filter of Canny to the IR image 800, and a first intermediate image 854 is generated through a combination 852 of the result image 850 and the IR image 800. Then, a first preprocessed IR image 858 is generated through a combination 856 of the first intermediate image 854, the second intermediate image 805, and the IR image 800.

Figure 8D:
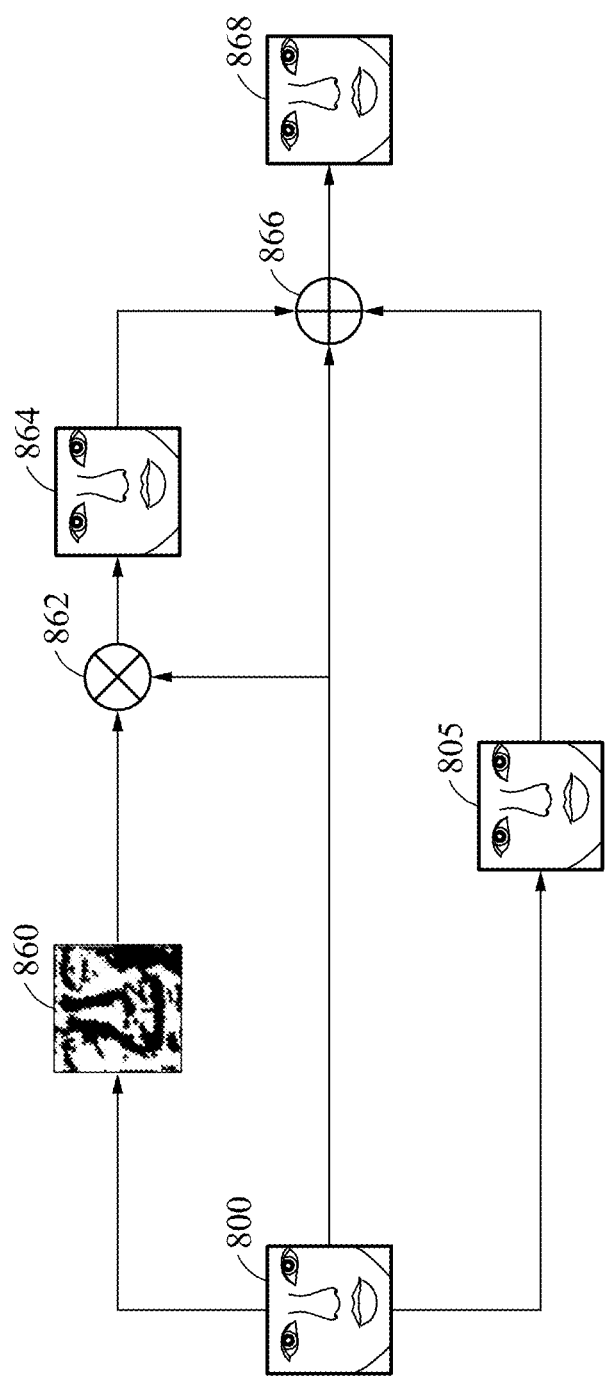

In still another example, referring to FIG. 8D, a result image 860 is generated by applying an edge enhancement filter of Sobel to the IR image 800, and a first intermediate image 864 is generated through a combination 862 of the result image 860 and the IR image 800. Then, a first preprocessed IR image 868 is generated through a combination 866 of the first intermediate image 864, the second intermediate image 805, and the IR image 800.

Each of the edge enhancement preprocessing processes shown in FIGS. 8A to 8D corresponds to the first edge enhancement preprocessing described herein. Further, in the examples of FIGS. 8A to 8D, if the IR image 800 is replaced with a depth image, each of the edge enhancement preprocessing processes may correspond to the second edge enhancement preprocessing applied to the depth image described herein.

Figure 8E:
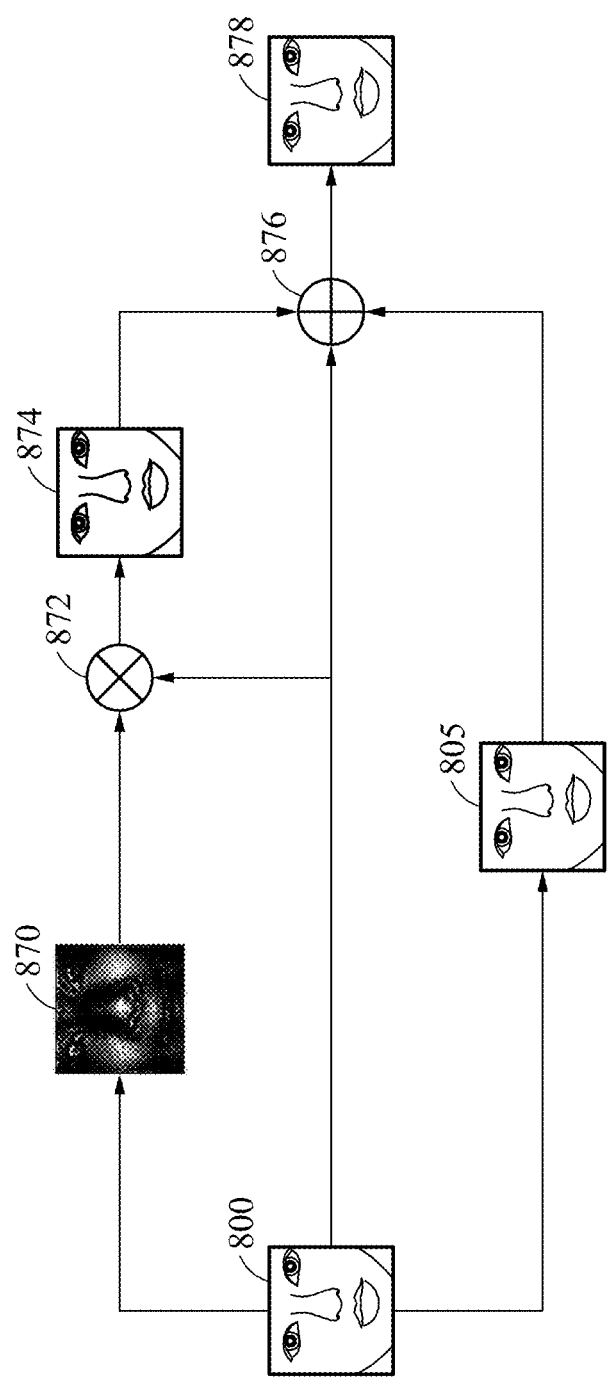

FIG. 8E illustrates an example of third edge enhancement preprocessing. Referring to FIG. 8E, a result image 870 is generated by applying an edge enhancement filter of Laplacian to the IR image 800, and a first intermediate image 874 is generated through a combination 872 of the result image 870 and the IR image 800. Then, a second preprocessed IR image 878 is generated through a combination 876 of the first intermediate image 874, the second intermediate image 805, and the IR image 800.

Figure 9:
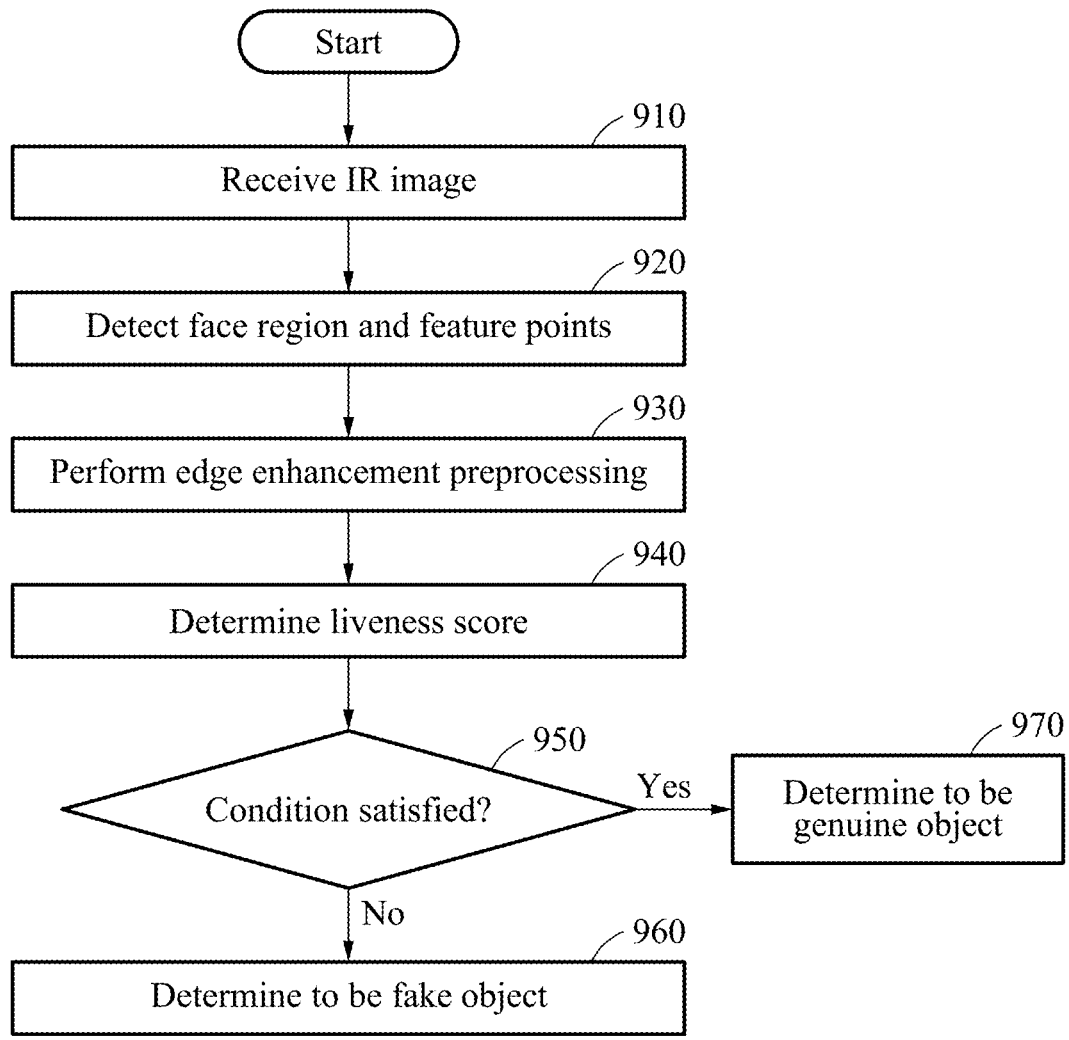
FIG. 9 illustrates an example of operations of a liveness test method.

FIG. 9 illustrates an example of operations of a liveness test method. The liveness test method may be performed by the liveness test apparatus described herein.

Referring to FIG. 9, in operation 910, the liveness test apparatus receives an IR image including an object. For example, the IR image is acquired by an image sensor configured to sense an IR ray. In operation 920, the liveness test apparatus detects a face region and feature points such as landmarks in the IR image. In operation 930, the liveness test apparatus performs edge enhancement preprocessing with respect to the IR image. The liveness test apparatus may perform the third edge enhancement preprocessing described herein, as the edge enhancement preprocessing. For example, an edge enhancement preprocessing scheme using a Laplacian filter may be performed, as described in the example of FIG. 8E.

In operation 940, the liveness test apparatus determines a liveness score with respect to the IR image on which the edge enhancement preprocessing is performed (hereinafter, referred to as the "preprocessed IR image"). The liveness test apparatus may determine the liveness score using a neural network-based liveness test model which receives the preprocessed IR image as an input, and may output a liveness score corresponding to the input. The liveness test model may correspond to the third liveness test model described herein.

In operation 950, the liveness test apparatus determines whether the liveness score satisfies a defined condition. For example, the liveness test apparatus may determine whether the liveness score is greater than a threshold value for determining a liveness result.

If the liveness score does not satisfy the condition, for example, the liveness score is less than or equal to the threshold value, the liveness test apparatus may determine the object to be a fake object, in operation 960. Conversely, if the liveness score satisfies the condition, for example, the liveness score is greater than the threshold value, the liveness test apparatus may determine the object to be a genuine object, in operation 970.

Figure 10:
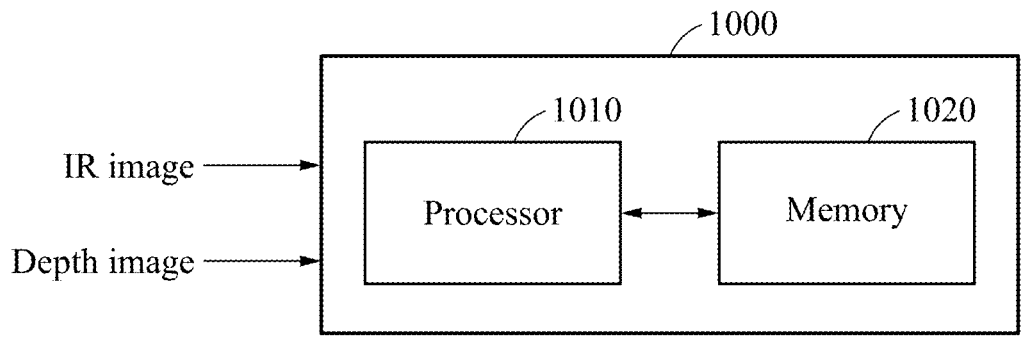
FIG. 10 illustrates an example of a configuration of a liveness test apparatus.

FIG. 10 illustrates an example of a configuration of a liveness test apparatus 1000.

Referring to FIG. 10, the liveness test apparatus 1000 may correspond to the liveness test apparatus described herein, and may perform a liveness test based on an IR image and a depth image. The liveness test apparatus 1000 includes, for example, a processor 1010 and a memory 1020. In an example, the liveness test apparatus 1000 may further include one or more image sensors to acquire an IR image and a depth image.

The memory 1020 is connected to the processor 1010 and stores instructions to be executed by the processor 1010, data to be computed by the processor 1010, and/or data processed by the processor 1010.

The processor 1010 may control the overall function and operation of the liveness test apparatus 1000 and may perform the one or more operations described with reference to FIGS. 1 to 9. In an example, the processor 1010 performs a liveness test with respect to an object based on the IR image and the depth image acquired by the one or more image sensors. The processor 1010 may generate a first preprocessed IR image in which an edge component is enhanced by performing first edge enhancement preprocessing with respect to the IR image. In addition, the processor 1010 may generate a preprocessed depth image in which an edge component is enhanced by performing second edge enhancement preprocessing with respect to the depth image.

The processor 1010 may determine a first liveness test result with respect to the object based on the first preprocessed IR image and the preprocessed depth image. In response to the object being determined to be a fake object according to the first liveness test result, the processor 1010 may determine the object to be a fake object, as a final liveness test result, without performing a second liveness test. Conversely, in response to the object being determined to be a genuine object according to the first liveness test result, the processor 1010 may perform the second liveness test. The processor 1010 may generate a second preprocessed IR image by performing third edge enhancement preprocessing on the IR image, and may determine a second liveness test result based on the second preprocessed IR image. The processor 1010 may determine a final liveness test result based on a second liveness test result. Reference may be made to the description of FIGS. 3 to 4B for further details, and thus a detailed description of determining the first, second, and final liveness test results will be omitted for conciseness.

The processor 1010 may generate a control signal based on the final liveness test result. For example, in response to the object being determined to be a genuine object, the processor 1010 generates a control signal to start a procedure for performing authentication with respect to the object. Conversely, in response to the object being determined to be a fake object, the processor 1010 may generate a control signal to block an access of the object or to reject a request (for example, a request for execution of a predetermined function) from the object.

Figure 11:
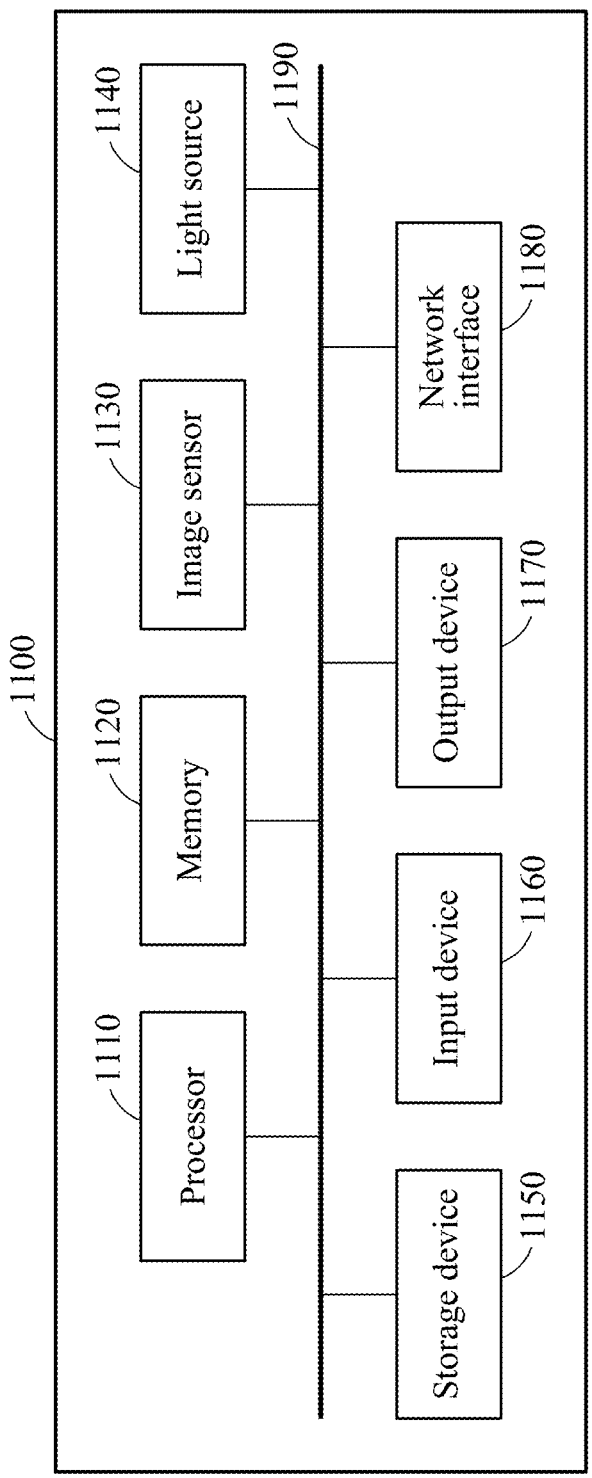
FIG. 11 illustrates an example of a configuration of an electronic device.

FIG. 11 illustrates an example of a configuration of an electronic device 1100.

Referring to FIG. 11, the electronic device 1100 may correspond to the electronic device described herein, and may perform the function of the liveness test apparatus 1000 of FIG. 10. The electronic device 1100 includes, for example, a processor 1110, a memory 1120, an image sensor 1130, a light source 1140, a storage device 1150, an input device 1160, an output device 1170, and a network interface 1180. The elements of the electronic device 1100 may communicate with each other through a communication bus 1190.

The processor 1110 may execute instructions and functions to perform a liveness test and/or a biometric authentication. For example, the processor 1110 processes the instructions stored in the memory 1120 or the storage device 1150. The processor 1110 may perform the one or more operations described with reference to FIGS. 1 to 10.

The memory 1120 may store information to be used to perform a liveness test and/or a biometric authentication. The memory 1120 may include a computer-readable storage medium or a computer-readable storage device. The memory 1120 stores necessary information and instructions to be executed by the processor 1110.

The image sensor 1130 may acquire an IR image including an object and a depth image including the object. In an example, the image sensor 1130 may include an IR camera configured to acquire an IR image and a depth camera configured to acquire a depth image. In another example, the image sensor 1130 may include a single image sensor, for example, an IR depth sensor and acquire the IR image and the depth image using the IR depth sensor.

The light source 1140 may radiate an IR ray under the control of the processor 1110. The light source 1140 may include, for example, at least one light-emitting diode (LED) or laser diode (LD) configured to project an IR ray. The light source 1140 may radiate an IR ray of a predetermined pattern, and when the IR ray of the predetermined pattern is reflected by an object, the reflected IR ray may be sensed by the image sensor 1130. Depth information of the depth image may be determined through a process of analyzing a reflection pattern when the radiated IR ray of the predetermined pattern returns by being reflected by the object.

The storage device 1150 may include a computer-readable storage medium or a computer-readable storage device. The storage device 1150 may store a greater quantity of information than the memory 1120 and may store the information for a relatively long time. For example, the storage device 1150 may include a magnetic hard disk, an optical disk, a flash memory, or a floppy disk.

The input device 1160 may receive an input from a user through a haptic, video, audio, or touch input. For example, the input device 1160 may include a keyboard, a mouse, a touch screen, a microphone, or any device configured to detect an input from a user and transmit the detected input to the electronic device 1100.

The output device 1170 may provide an output of the electronic device 1100 to the user through a visual, audio, or haptic channel. The output device 1170 may include, for example, a display, a touch screen, a speaker, a vibration generator, or any device configured to provide an output to the user. The network interface 1180 may communicate with an external device through a wired or wireless network.

The processors 1010 and 1110, the memories 1020 and 1120, the storage device 1150, the input device 1160, the output device 1170, the network interface 1180, the communication bus 1190, the processors, the memories, and other components and devices in FIGS. 1 to 11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method with liveness testing, comprising:
acquiring an infrared (IR) image including an object, and a depth image including the object;
generating a first preprocessed IR image by performing first edge enhancement preprocessing on the IR image;
generating a preprocessed depth image by performing second edge enhancement preprocessing on the depth image;
determining a first liveness test result based on the first preprocessed IR image and the preprocessed depth image;
generating a second preprocessed IR image by performing third edge enhancement preprocessing on the IR image, in response to the first liveness test result satisfying a condition;
determining whether the object is a genuine object based on a second liveness test result based on the second preprocessed IR image; and
allowing or blocking access to a device, based on a result of the determining of whether the object is the genuine object.

2. The method of claim 1, wherein the third edge enhancement preprocessing is a different type of edge enhancement preprocessing than the first edge enhancement preprocessing.

3. The method of claim 1, wherein the determining of the second liveness test result comprises determining the second liveness test result based on a first liveness score corresponding to the first preprocessed IR image, a second liveness score corresponding to the preprocessed depth image, and a third liveness score corresponding to the second preprocessed IR image.

4. The method of claim 3, wherein the first liveness score is determined using a neural network-based first liveness test model that receives the first preprocessed IR image as an input,
wherein the second liveness score is determined using a neural network-based second liveness test model that receives the preprocessed depth image as an input, and
wherein the third liveness score is determined using a neural network-based third liveness test model that receives the second preprocessed IR image as an input.

5. The method of claim 1, wherein the first preprocessed IR image is an IR image in which an edge component is enhanced in comparison to the IR image.

6. The method of claim 1, wherein the generating of the first preprocessed IR image comprises:
generating a first intermediate image based on pixel values of a current pixel and neighboring pixels in the IR image;
generating a second intermediate image by performing normalization on the IR image; and
generating the first preprocessed IR image based on the IR image, the first intermediate image, and the second intermediate image.

7. The method of claim 6, wherein a pixel of the first preprocessed IR image has a pixel value of a pixel at a corresponding position in the IR image, a pixel value of a pixel at a corresponding position in the first intermediate image, and a pixel value of a pixel at a corresponding position in the second intermediate image.

8. The method of claim 1, wherein the generating of the preprocessed depth image comprises:
transforming the object, in the depth image, into a frontal object; and
generating the preprocessed depth image by performing the second edge enhancement preprocessing on the depth image in which the object is transformed into the frontal object.

9. The method of claim 8, wherein the transforming of the object, in the depth image, into the frontal object comprises:
determining feature points in the depth image;
determining a transformation matrix based on positions of the respective feature points in the depth image and positions of reference points corresponding to the respective feature points; and
transforming the object, in the depth image, into the frontal object by applying the determined transformation matrix to the object in the depth image.

10. The method of claim 1, wherein the determining of whether the object is a genuine object comprises:
determining a first liveness score using a neural network-based first liveness test model that receives the first preprocessed IR image as an input;
determining a second liveness score using a neural network-based second liveness test model that receives the preprocessed depth image as an input; and
determining whether the object is a genuine object based on the first liveness score and the second liveness score.

11. A non-transitory computer-readable storage medium storing instructions that, when executed by a processor, cause the processor to perform the method of claim 1.

12. An apparatus with liveness testing, comprising:
at least one image sensor configured to acquire an infrared (IR) image including an object, and a depth image including the object; and
a processor configured to:
generate a first preprocessed IR image by performing first edge enhancement preprocessing on the IR image;
generate a preprocessed depth image by performing second edge enhancement preprocessing on the depth image;
determine a first liveness test result based on the first preprocessed IR image and the preprocessed depth image;
generate a second preprocessed IR image by performing third edge enhancement preprocessing on the IR image, in response to the first liveness test result satisfying a condition;
determine whether the object is a genuine object based on a second liveness test result based on the second preprocessed IR image, and
allow or block access to the apparatus, based on a result of the determining of whether the object is the genuine object.

13. The apparatus of claim 12, wherein the processor is further configured to determine the second liveness test result based on a first liveness score corresponding to the first preprocessed IR image, a second liveness score corresponding to the preprocessed depth image, and a third liveness score corresponding to the second preprocessed IR image.

14. The apparatus of claim 12, wherein the processor is further configured to:
generate a first intermediate image based on pixel values of a current pixel and neighboring pixels in the IR image;
generate a second intermediate image by performing normalization on the IR image; and
generate the first preprocessed IR image based on the IR image, the first intermediate image, and the second intermediate image.

15. The apparatus of claim 12, wherein the processor is further configured to:
   transform the object, in the depth image, into a frontal object; and
   generate the preprocessed depth image by performing the second edge enhancement preprocessing on the depth image in which the object is transformed into the frontal object.

16. The apparatus of claim 15, wherein the processor is further configured to:
   determine feature points in the depth image;
   determine a transformation matrix based on positions of the respective feature points in the depth image and positions of reference points corresponding to the respective feature points; and
   transform the object, in the depth image, into the frontal object by applying the determined transformation matrix to the object in the depth image.

17. The apparatus of claim 15, wherein the processor is further configured to:
   determine a first liveness score using a neural network-based first liveness test model that receives the first preprocessed IR image as an input;
   determine a second liveness score using a neural network-based second liveness test model that receives the preprocessed depth image as an input, and
   determine whether the object is a genuine object based on the first liveness score and the second liveness score.

18. A user authentication method, comprising:
   performing a first liveness test on an object based on a first preprocessed IR image and a preprocessed depth image, wherein the first preprocessed IR image is obtained from first edge enhancement preprocessing of an acquired IR image including the object, and the preprocessed depth image is obtained from second edge enhancement preprocessing of an acquired depth image including the object;
   preliminarily determining whether to block access to a device to which access is sought by a user, based on a first liveness test score determined by the first liveness test; and
   in response to a result of the preliminarily determining whether to block access to the device being preliminarily determining not to block access to the device performing a second liveness test based on a second preprocessed IR image obtained from third edge enhancement preprocessing of the acquired IR image to determine whether the object is a genuine object, and
   determining whether to allow access to the device, based on a second liveness test score determined by the second liveness test.

19. The user authentication method of claim 18, wherein the performing of the first liveness test comprises:
   determining a first liveness score using a neural network-based first liveness test model that receives the first preprocessed IR image as an input;
   determining a second liveness score using a neural network-based second liveness test model that receives the preprocessed depth image as an input; and
   determining the first liveness test score by combining the first and second liveness scores.

20. The user authentication method of claim 18, wherein the performing of the first liveness test comprises:
   determining a first liveness score using a neural network-based first liveness test model that receives the first preprocessed IR image as an input;
   determining a second liveness score using a neural network-based second liveness test model that receives the preprocessed depth image as an input; and
   determining the first liveness test score by combining the first and second liveness scores, and
   wherein the performing of the second liveness test comprises:
   determining a third liveness score using a neural network-based third liveness test model that receives the second preprocessed IR image as an input; and
   determining the second liveness test score by combining the first, second, and third liveness scores.

21. The user authentication method of claim 20, wherein the preliminarily determining of whether to block access to the device comprises preliminarily determining whether to block access to the device by comparing the first liveness test score to a first threshold score, and
   wherein the determining of whether to allow access to the device comprises determining whether to allow access to the device by comparing the second liveness test score to a second threshold score.

* * * * *